United States Patent
Okano

(10) Patent No.: US 8,854,505 B2
(45) Date of Patent: Oct. 7, 2014

(54) DUST-REMOVAL OPTICAL DEVICE, A DUST-REMOVAL IMAGING DEVICE, AND METHOD OF MANUFACTURING AN OPTICAL DEVICE FOR REMOVING DUST

(75) Inventor: Kosuke Okano, Yokohama (JP)

(73) Assignee: Nikon Corporation, Tokyo (JP)

(*) Notice: Subject to any disclaimer, the term of this patent is extended or adjusted under 35 U.S.C. 154(b) by 905 days.

(21) Appl. No.: 12/591,150

(22) Filed: Nov. 10, 2009

(65) Prior Publication Data
US 2010/0171872 A1    Jul. 8, 2010

(30) Foreign Application Priority Data

| Nov. 13, 2008 | (JP) | ................................. 2008-291365 |
| Nov. 13, 2008 | (JP) | ................................. 2008-291410 |
| Nov. 4, 2009  | (JP) | ................................. 2009-253388 |

(51) Int. Cl.
| *H04N 5/217* | (2011.01) |
| *G02B 13/16* | (2006.01) |
| *B08B 7/02*  | (2006.01) |
| *H04N 5/225* | (2006.01) |
| *G02B 27/00* | (2006.01) |

(52) U.S. Cl.
CPC ................ *B08B 7/02* (2013.01); *H04N 5/2253* (2013.01); *H04N 5/2171* (2013.01); *G02B 27/0006* (2013.01)
USPC ......................................... 348/241; 348/335

(58) Field of Classification Search
None
See application file for complete search history.

(56) References Cited

U.S. PATENT DOCUMENTS

| 4,896,174 | A  | * | 1/1990  | Stearns ........................ 347/120 |
| 6,911,593 | B2 | * | 6/2005  | Mazumder et al. ........... 136/251 |
| 7,999,173 | B1 | * | 8/2011  | Ashpis ........................... 136/251 |
| 2006/0038120 | A1 | * | 2/2006 | Lean et al. ..................... 250/288 |
| 2006/0087584 | A1 | * | 4/2006 | Noto ............................ 348/374 |
| 2007/0247543 | A1 | * | 10/2007 | Hozumi et al. ............... 348/360 |
| 2007/0285551 | A1 | * | 12/2007 | Noto ............................ 348/335 |
| 2008/0054760 | A1 | * | 3/2008  | Kataoka ....................... 310/317 |
| 2008/0297646 | A1 | * | 12/2008 | Urakami et al. .............. 348/340 |
| 2009/0190219 | A1 | * | 7/2009  | Teo et al. ..................... 359/507 |

FOREIGN PATENT DOCUMENTS

| JP | A-2002-204379 | 7/2002 |
| JP | A-2005-219458 | 8/2005 |
| JP | A-2005-331829 | 12/2005 |
| JP | A-2006-030678 | 2/2006 |
| JP | A-2006-058302 | 3/2006 |
| JP | A-2006-71851  | 3/2006 |

(Continued)

OTHER PUBLICATIONS

Kawamoto et. al., Traveling Wave Transport of Particles and Particle Size Classification, Sep. 2003, International Conference on Digital Printing Technologies, p. 100-106.*

(Continued)

*Primary Examiner* — Justin P Misleh
(74) *Attorney, Agent, or Firm* — Oliff PLC

(57) ABSTRACT

An optical device comprises a vibration member 20 provided on a substrate 36 transmitting light so as to vibrate said substrate, a driving circuit 29 for driving said vibration member so as to generate nodes of vibration 99 on said substrate, a plurality of electrodes 42, at least one part thereof provided at neighbor of said nodes of vibration which transmits light, and an output circuit 28 to output voltage to said plurality of electrode so as to change an electric field of a surface of said substrate.

7 Claims, 21 Drawing Sheets

(56) References Cited

FOREIGN PATENT DOCUMENTS

| JP | A-2007-147991 | 6/2007 |
|----|---------------|--------|
| JP | A-2007-318496 | 12/2007 |
| JP | A-2008-29917 | 2/2008 |
| JP | A-2008-70750 | 3/2008 |
| JP | A-2008-99332 | 4/2008 |

OTHER PUBLICATIONS

Kawamoto et. al., Traveling Wave Transport of Particles and Particle Size Classification, Sep. 2004, Journal of Imaging Science and Technology, vol. 48, No. 5, p. 404-411.*

Kawamoto et al.; "Travelling Wave Transport of Particles and Particle Size Classification; " *The Japan Society of Mechanical Engineers Technical Report Journal*; 2008; pp. 28-33; vol. No. 69-681, Paper No. 02-1059 (with translation).

Kawamoto et al.; "Fundamental Investigation on Electrostatic Travellling-Wave Transport of Liquid Drop Classificaton;" *The Japan Society of Mechanical Engineers Technical Report Journal*; 2005; vol. No. 71-712. Paper No. 05-02200 (with translation).

May 8, 2012 Office Action issued in Japanese Patent Application No. 2009-253388 (English Translation only).

* cited by examiner

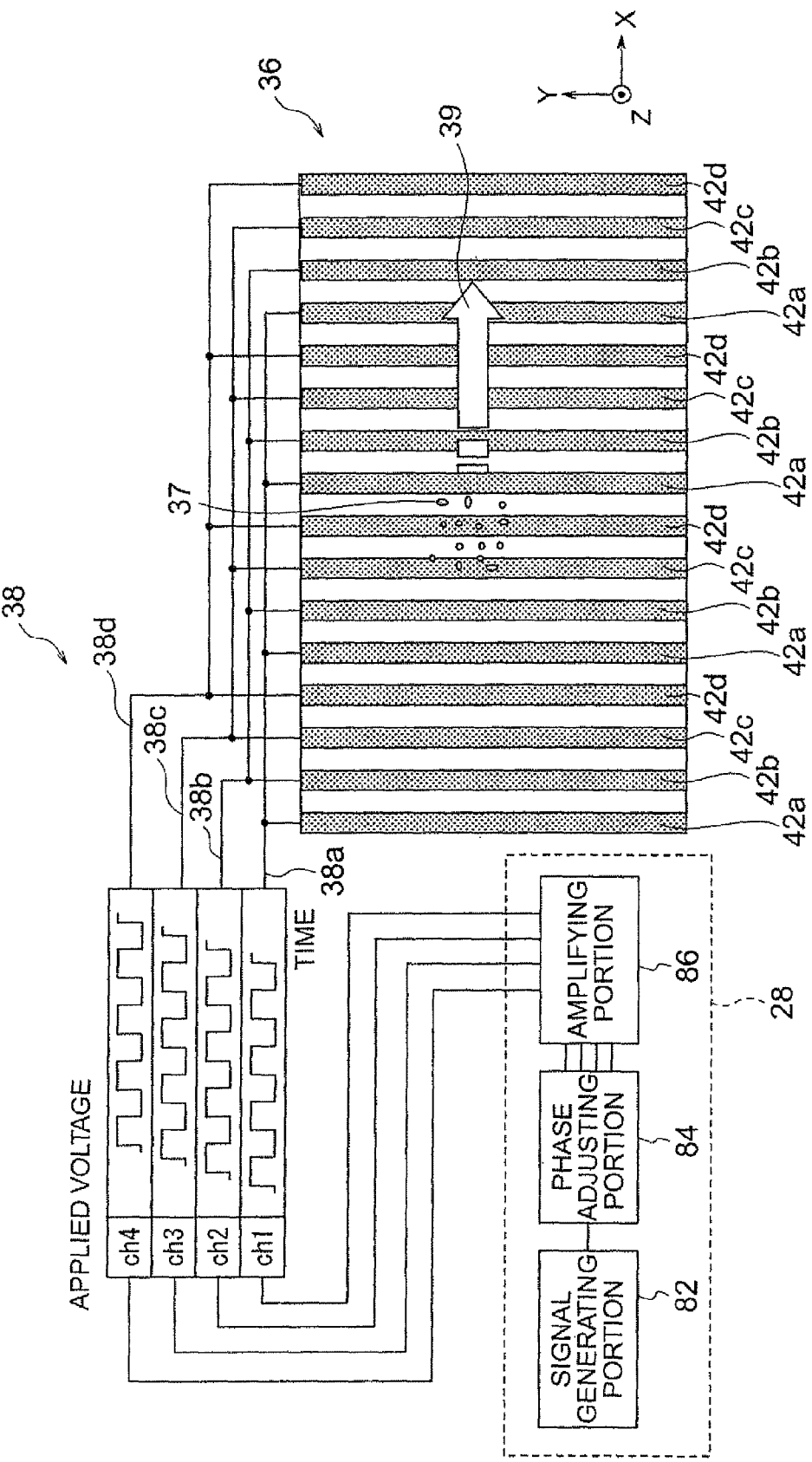

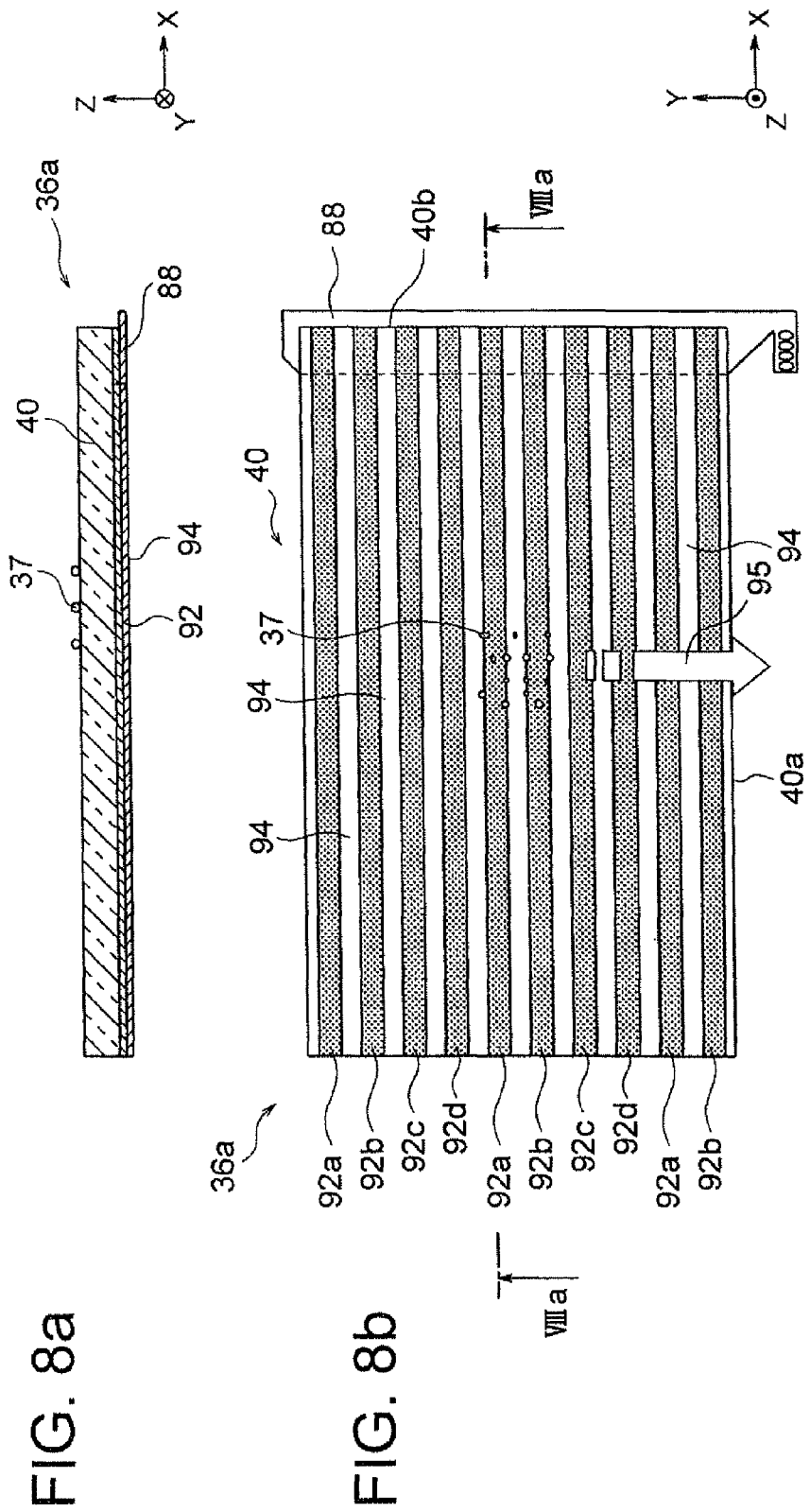

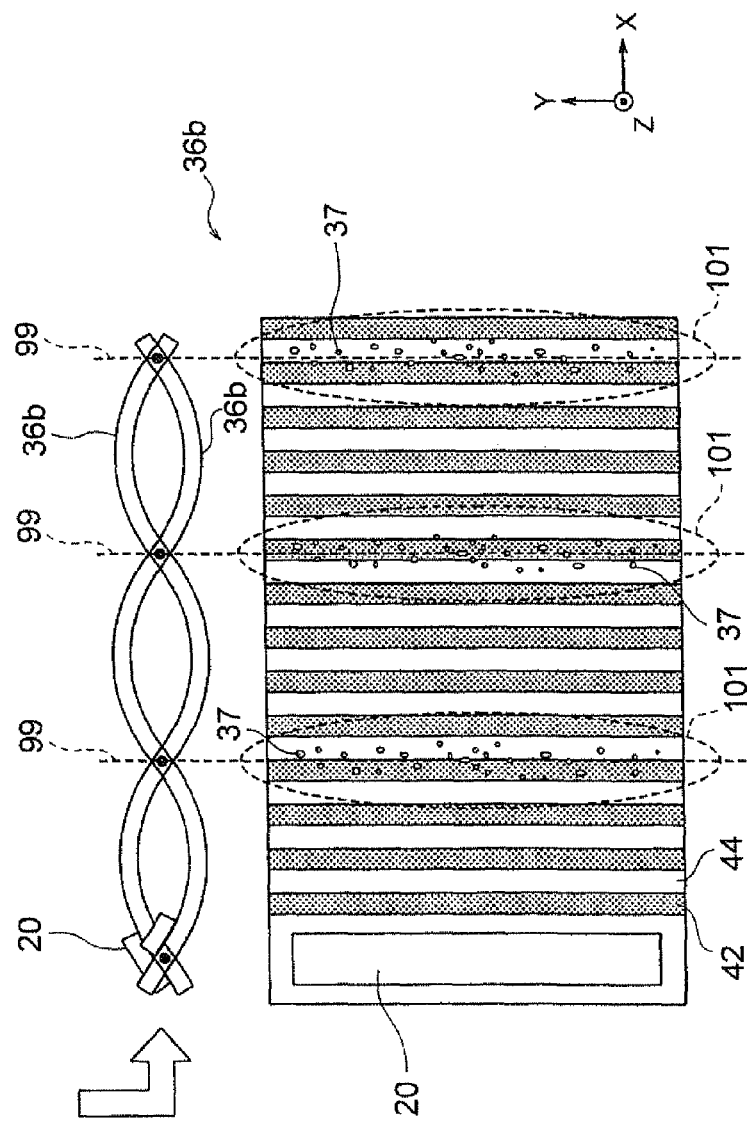

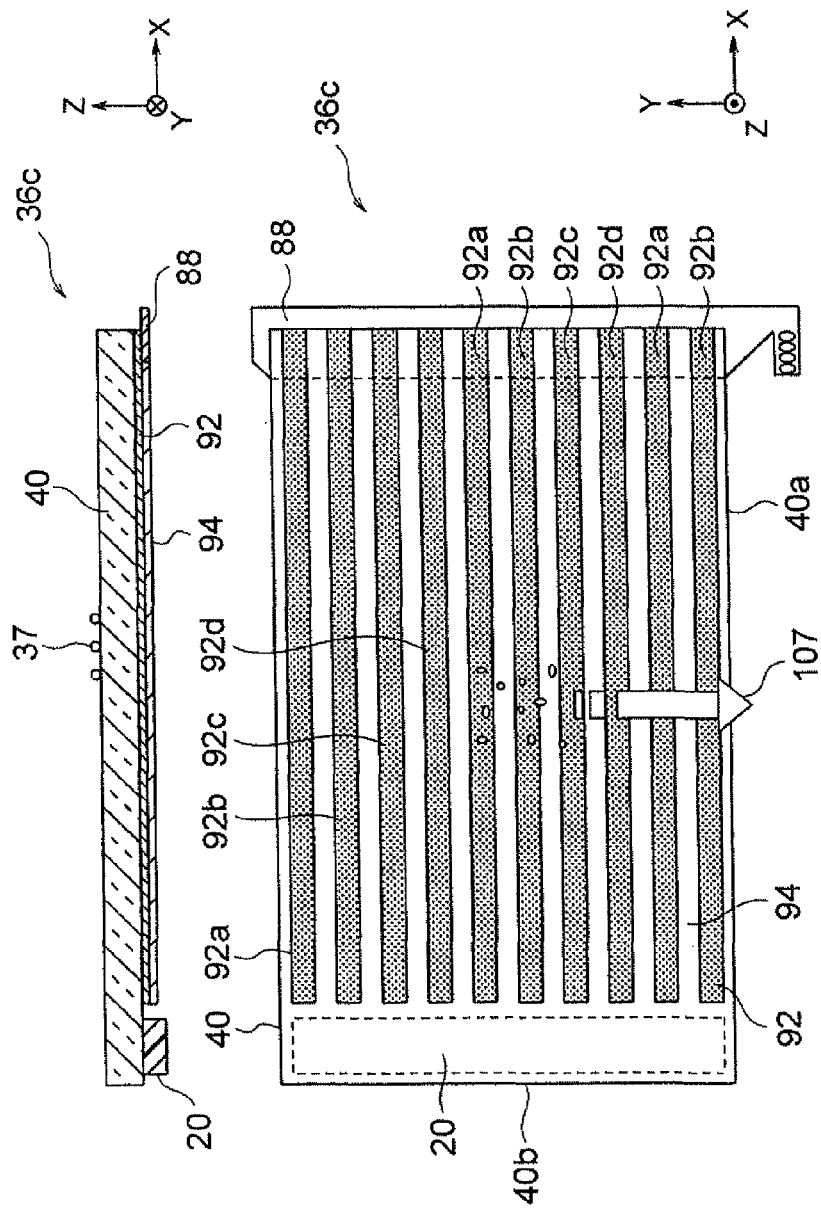

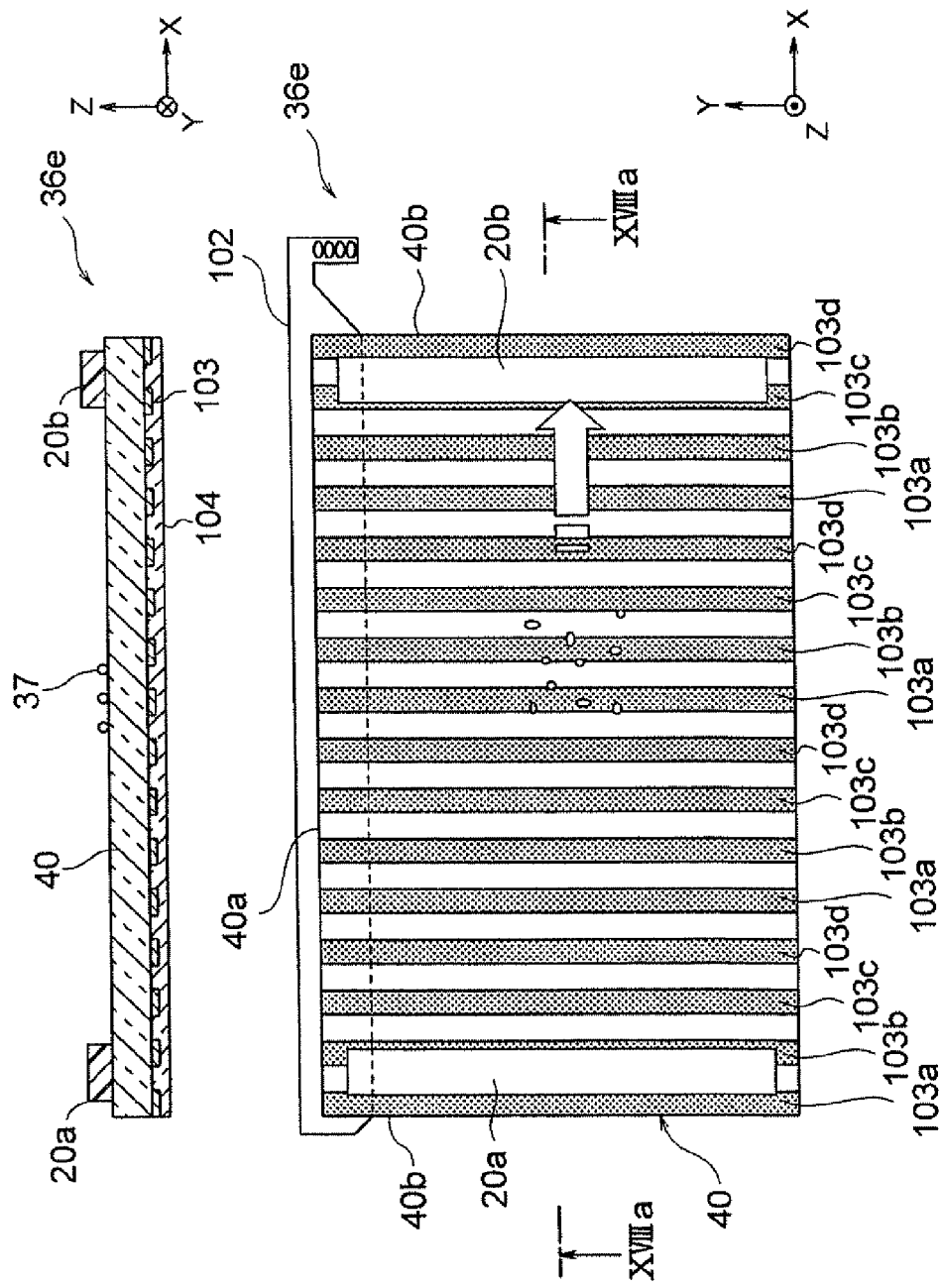

DUST-REMOVAL OPTICAL DEVICE, A DUST-REMOVAL IMAGING DEVICE, AND METHOD OF MANUFACTURING AN OPTICAL DEVICE FOR REMOVING DUST

BACKGROUND OF THE INVENTION

1. Technical Field of the Invention

The present invention relates to an optical device, an imaging device and a method for manufacturing optical device, more precisely, relates to an optical device, etc. having dust removing function.

2. Description of the Related Art

In recent years, in a lens interchangeable digital camera, etc., there are problems such that dust is shown in a taken image due to accretion of the dust on a surface of an optical low-pass filter of an image pick-up element. In order to solve such problems, a system has been developed wherein an anti-dust member is provided between an image pick-up element and an optical system to ensure dust-prevention for the image pick-up element and filters as well as removing the attached dust on the anti-dust member by vibration (refer to Japanese Patent Laid Open No. 2008-99332).

However, according to conventional systems, since the dust member is removed by physical vibration, there are problems that dust of small mass to which an inertia force is hardly generated and dust adhered via an electrostatic force by electrostatic charge are hard to remove efficiently.

SUMMARY OF THE INVENTION

A purpose of the invention is to provide an optical device, an imaging device which are available to efficiently remove dust adhered to a substrate efficiently which transmits right and a method for manufacturing said optical device.

PROBLEMS TO BE SOLVED BY THE INVENTION

In order to achieve the above purpose, an optical device according to the present invention comprises a vibration member (20, 20a, 20b) provided on a light transmissive substrate (36, 36a, 36b, 36c, 36d, 36e) so as to vibrate said substrate, a driving circuit (29) for driving said vibration member so as to generate nodes of vibration on said substrate, a plurality of electrodes (42, 92, 98, 103), at least one part thereof provided at neighbor of said nodes of vibration which transmits light, and an output circuit (28) to output voltage to said plurality of electrode so as to change an electric field of a surface of said substrate.

Also, for example, said electrodes may be provided substantially parallel to said nodes of vibration of said substrate.

Also, for example, in the optical device according to the present invention, said vibration member and said electrodes may be provided substantially parallel.

Also, for example, in the optical device according to the present invention, said vibration member and said electrodes may be provided substantially orthogonally.

Also, for example, said substrate may be a rectangular shape, said vibration member may be provided substantially parallel to sides (40a, 40b) of said substrate.

Also, for example, said output circuit may output voltage to said electrodes so as to move an electric field generated on said substrate when said driving circuit drives said vibration member.

Also, for example, said output circuit may output voltage to said electrodes so as to move an electric field generated on said substrate after said driving circuit drives said vibration member.

Also, for example, the optical device according to the present invention may comprise a circuit board (38, 88, 96, 102) provided on said substrate electrically connecting said output circuit and said electrode, at least one part of said vibration member may be provided as facing to said circuit board.

Also, for example, said plurality of electrodes may comprise a first electrode (42a, 92a, 98a, 103a) which is provided along a surface of said substrate and a second electrode (42b, 92b, 98b, 103b) which is provided along the surface of said substrate in parallel to said first electrode.

Also, for example, said output circuit may apply a phase of AC voltage to said second electrode which is different from a phase of AC voltage applied to said first electrode.

Also, for example, said output circuit may output voltage to said first electrode and said second electrode so that an electric field generated on said substrate moves to a direction which is vertical to a direction where said first electrode is formed.

An imaging device according to the present invention comprises the optical device as set forth in any one of the above, an image taking portion (16) provided as facing to said substrate of said optical device for taking image by an optical system.

A method for manufacturing optical device according to the present invention comprises steps of providing a vibration member (20, 20a, 20b) and electrodes (42, 92, 98, 103) on a substrate, said substrate and electrodes transmitting light, connecting a driving circuit (29) to said vibration member to drive said vibration member, connecting an output circuit (28) to said electrodes, said output circuit outputs voltage to said electrodes so as to move an electric field generated on said substrate.

Also, the method for manufacturing optical device according to the present invention wherein said driving circuit may be adjusted so as to generate nodes of vibration (99) on neighbor at least one portion of said electrodes.

Also, for example, the optical device of the present invention may comprise a voltage supplying circuit (131) to supply a voltage signal to said driving circuit (129) and said output circuit (128).

Also, for example, the optical device of the present invention may comprise a sweep circuit section (131a) so as to change a frequency of said voltage signal with a time passage.

Also, for example, the optical device of the present invention may comprise a switching circuit (133) provided between said driving circuit, said output circuit and said voltage supplying circuit so as to electrically connect by switching at least one of said driving circuit and said output circuit to said voltage supplying circuit.

Also, for example, the optical device of the present invention wherein, at a series of dust removing operation, said switching circuit may connect said voltage supplying circuit and said output circuit after connecting said voltage supplying circuit and said driving circuit, then connects said voltage supplying circuit and said driving circuit again.

Note that, in the above explanation, for easily understanding of the present invention it is specified with reference numerals corresponding drawings showing embodiments, the present invention is not limited thereto. It can be modified following mentioned embodiment appropriately, and at least one part can be substituted. Further, constitutional elements, which are not particularly limited to arrangement thereof, may be arranged at positions where functions thereof can be achieved which are not limited to the disclosed arrangement in embodiments.

BRIEF DESCRIPTION OF THE DRAWINGS

Below, the present invention will be specified based on embodiments shown in drawings.

FIG. 7 is a schematic view for explaining dust removing operation by using the anti dust filter shown in FIG. 6.

FIG. 8a and FIG. 8b are a cross sectional view and a plane view of an anti dust filter in an optical device according to a second embodiment of the present invention.

FIG. 13 is a schematic view of a first step at dust removal operation by the anti dust filter shown in FIG. 12a and FIG. 12b.

FIG. 16a and FIG. 16b are a cross sectional view and a plane view of an anti dust filter in an optical device according to a fourth embodiment of the present invention.

FIG. 18a and FIG. 18b are a cross sectional view and a plane view of an anti dust filter in an optical device according to a sixth embodiment of the present invention.

DETAILED DESCRIPTION OF THE INVENTION

First Embodiment

Figure 1:
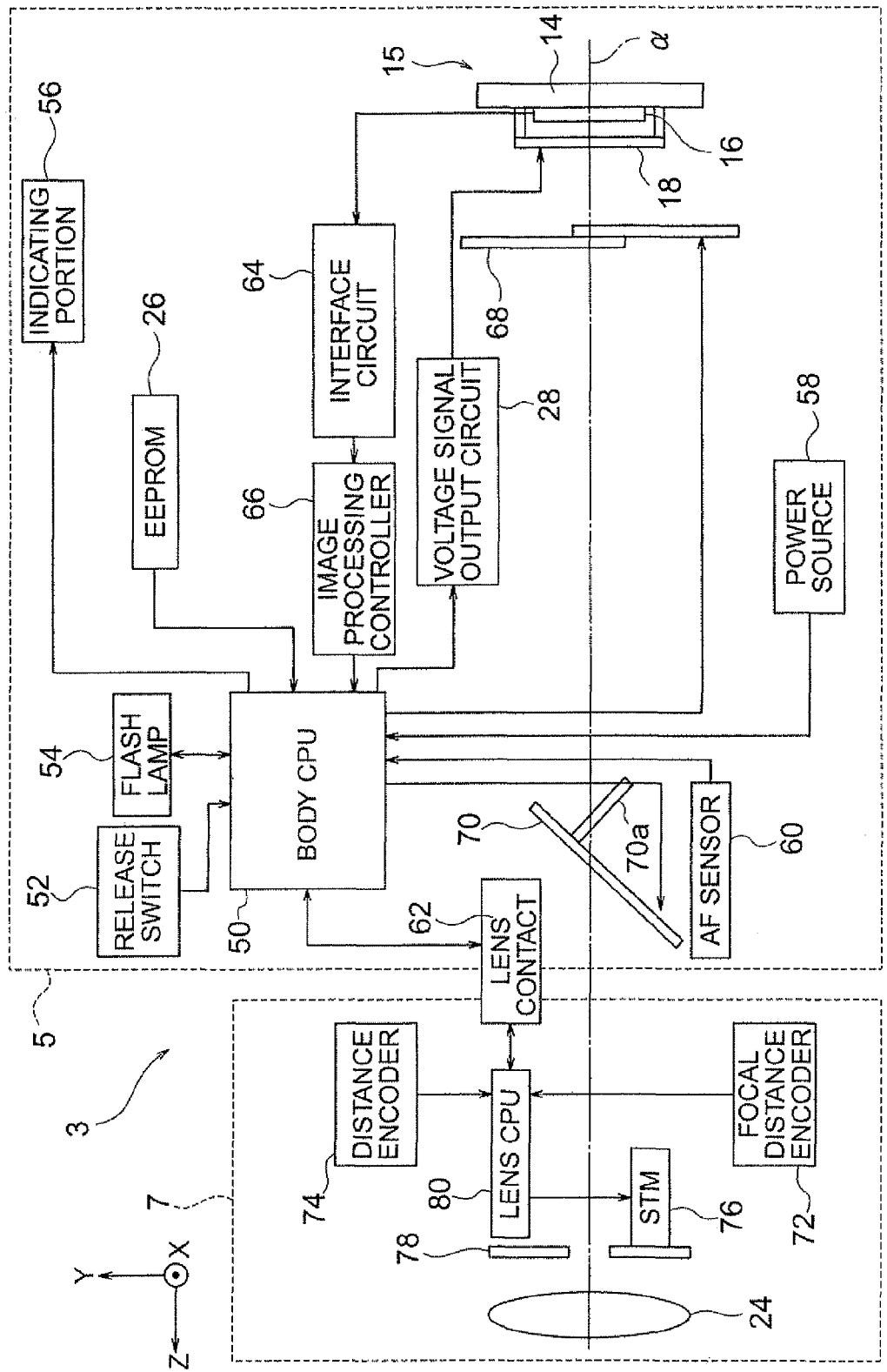
FIG. 1 is a whole block diagram of a camera to which an optical device according to one embodiment of the present invention is equipped.
Figure 2:
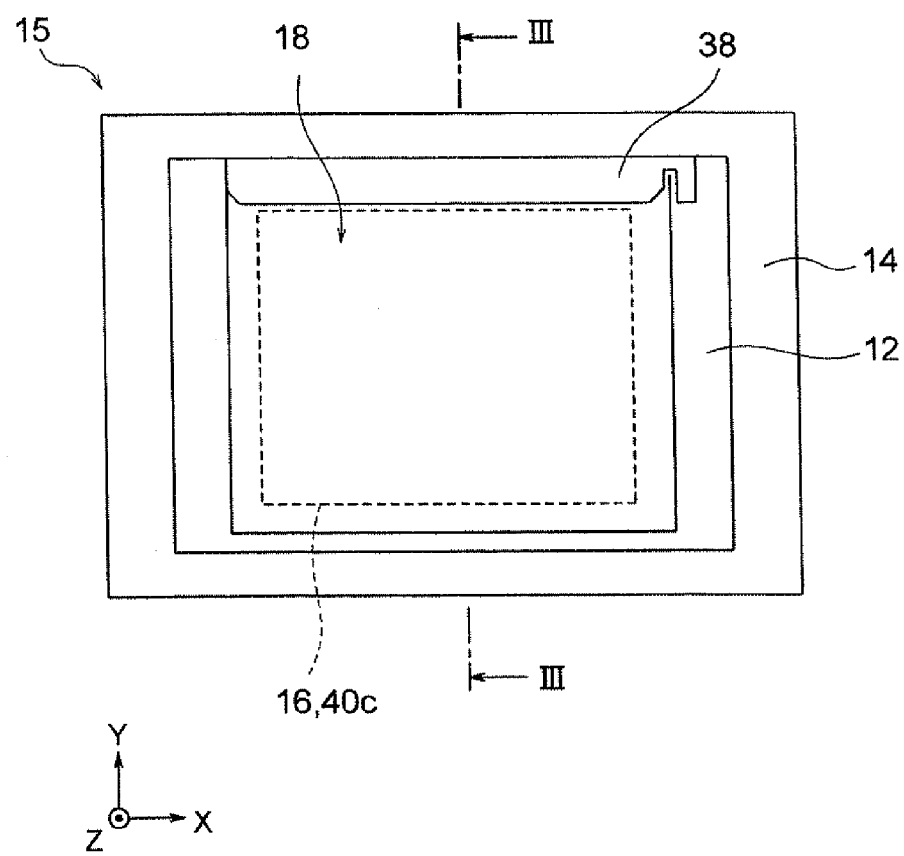
FIG. 2 is a plain view of a neighboring part of an image pick up element equipped to the camera shown in FIG. 1.

FIG. 1 is a block diagram of a whole camera 3 to which an optical device according to one embodiment of the present invention is equipped. The camera 3 comprises a camera body 5 and a lens barrel 7. The lens barrel is equipped detachably to the camera body 5. Note that in the specification of the camera 3, as shown in FIG. 1, FIG. 2, etc., it will be specified that a direction from the lens barrel 7 to the camera body 5 which is substantially in parallel to an optical axis α is defined as a negative direction of a Z-axis, directions which are perpendicular to the Z-axis are defined as a X-axis direction and a Y-axis direction.

As for a camera wherein the optical device according to the present invention is equipped, it is not limited to an interchangeable lens camera shown in FIG. 1, it may be a camera wherein the lens barrel 7 and the camera body 5 are integral, and types of camera are not particularly limited. Also, the optical device according to the present invention is not limited to a still camera, it can be applied to optical devices such as a video camera, a microscope, mobile phone and the like.

In the camera body 5 and the lens barrel 7, a plurality of optical components is arranged along a photo taking optical system optical axis α. An image pick up element neighbor portion 15 is arranged at a back side (Z-axis negative direction side) in the camera body 5 shown in FIG. 1, a shutter 68 is arranged in front of the optical axis α direction of the image pick up element neighbor portion 15 (Z-axis positive direction side). A mirror 70 is arranged in front of the optical a direction of the shutter 68, a diaphragm portion 78 and an optical lens group 24 contained within the lens barrel 7 are arranged in front of the mirror 70.

A body CPU 50 is contained within the camera body 5 and is connected to a lens CPU 80 via a lens contact 62. The body CPU 50 comprises a communication function with the lens barrel 7 and a control function of the camera body 5. The lens contact 62 causes electrically connecting the body CPU 50 and the lens CPU 80. A power supply 58 is connected with the body CPU 50 so as to supply electric power to electrical components equipped in the camera body 5 and the lens barrel 7.

A release switch 52, a flash lamp 54, an indicating portion 56, EEPROM (memory) 26, an image processing controller 66, AF sensor 60, a voltage signal output circuit 28 and the like are connected to the body CPU 50. The image pick-up element unit 16 of the image pick-up element neighbor portion 15 is connected with the image processing controller 66 via an interface circuit 64. The image processing controller 66 and the interface circuit 64 enables to control an image processing of an image taken by the image pick-up element 16 based on a signal from the body CPU 50. The image pickup element unit 16 comprises, for example, a solid-state image pickup element such as CCD and CMOS and the like.

The indicating portion 56 is composed of, mainly, a liquid crystal display device and the like, which displays output results, menu and the like. The release switch 52 is a switch for operating timing of shutter driving. The release switch 52 outputs a half pressing signal and a fully pressing signal. When the half pressing signal is input from the release switch 52, the body CPU 50 controls actions of preparing to capture an image such as AF controlling, AE controlling and the like, when the fully pressing signal is input from the release switch 52, the body CPU 50 controls exposure actions such as mirror up, shutter driving and the like.

The quick return mirror 70 is for showing an image to a finder at decision of picture composition, which eliminates from an optical line during exposure. The quick return mirror 70 is driven by a mirror driving portion (for example, DC motor) which is not shown in figures.

A sub-mirror 70a is connected with the mirror 70 which leads light to the AF sensor 60. The sub-mirror 70a eliminates from the optical line during exposure too.

A shutter 68 controls an exposure time. The shutter 68 is driven by a shutter driving portion (for example, DC motor) which is not shown in figures according to a control of the body CPU 50.

The AF sensor 60 is a sensor for conducting Auto focusing (AF). As the AF sensor, normally, a CCD is used. The EEPROM 26 memorizes parameters and the like which are necessary for controlling by the body CPU 50, and outputs to the body CPU, if necessary.

A focal distance encoder 74, a distance encoder 72, a diaphragm portion 78, a driving motor 76 configured to drive the diaphragm portion 78, the lens CPU 80, the lens contact 62 and the optical lens group 24 are equipped in the lens barrel 7 shown in FIG. 1.

The lens CPU 80 comprises a communication function with the body CPU 50 and a control function of electronic components equipped in the lens barrel 7. For example, the lens CPU 80 outputs focal distance information, target distance information and the like to the body CPU 50 via the lens contact 62. Also, release information, AF information are input to the lens CPU 80 from the body CPU 50. The lens CPU 80 can control the driving motor 76 of the diaphragm 78 and the like based on the information.

The focal distance encoder 74 determines the focal distance from position information of a zooming lens group which is not shown and outputs thereof to the lens CPU 80. The focal encoder 72 calculates the subject distance from position information of a focusing lens group and outputs it to the lens CPU 80.

As shown in FIG. 1, the voltage signal output circuit 28 is equipped in the camera body 5. The voltage signal output circuit 28 outputs voltage to a plurality of electrode arranged on a filter portion 18 in the image pick up element neighbor portion 15 based on the control signal from the body CPU 50.

Figure 3:
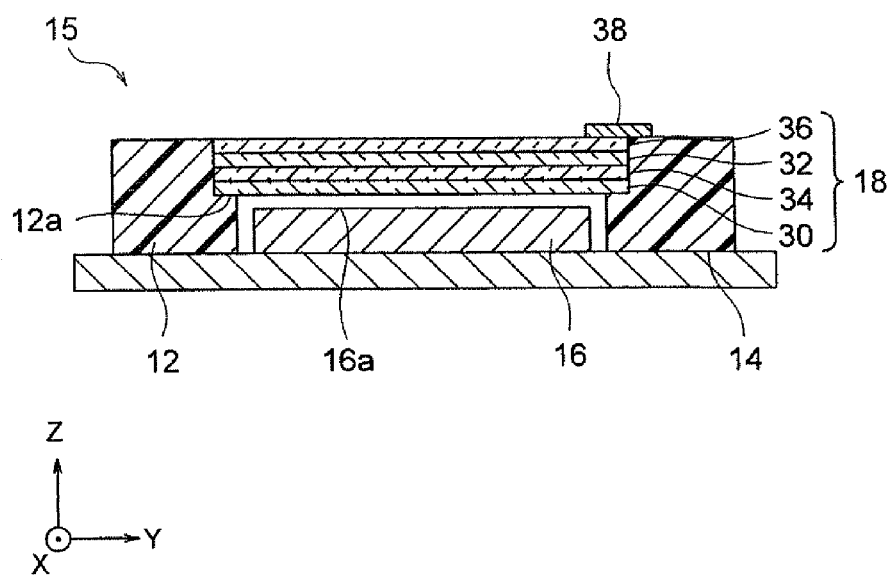
FIG. 3 is a schematic cross sectional view of the neighboring part of the image pick up element along a line shown in FIG. 2.

FIG. 2 is a plane view of the image pick up element neighbor portion 15 equipped in the camera shown in FIG. 1. The image pick up element neighbor portion 15 comprises a unit fixing base plate 14, a case 12, a filter portion 18 and the image pick up element unit 16. Also, the image pick up element neighbor portion 15 comprises a wiring portion 38 attached to the filter portion 18. As shown in FIG. 3 which is a cross sectional view of the image pick up element neighbor portion 15, the image pick up element 16 and the case 12 are arranged on a surface of the Z-axis positive direction side of the unit fixing base plate 14 having a rectangular plate shape. The image pick up element 16 is arranged in a status that an image pick up face 16a faces to the Z-axis positive direction side. The case 12 has an architrave shape and is arranged as enclosing a peripheral of the image pick up element unit 16. The case 12 is formed by using a material having insulating property such as synthetic resin, ceramics and the like.

A mounting portion 12a so as to mount the filter portion 18 is formed on an internal circumferential face of the case 12. The filter portion 18 has a rectangular shape and is designed that a peripheral of the filter portion 18 contacts with the mounting portion 12a. The filter portion 18 is mounted to the case 12 by, for example, adhesive bonds and the like. The image pick up unit 16 is provided as facing to the filter portion 18, and a light passes through the filter portion 18 is input to an image pick up face 16a of the image pick up element unit 16.

As shown in FIG. 3, a peripheral of the image pick up element unit 16 is sealed by the unit fixing base plate 14, the case 12 and the filter portion 18, the image pick up element neighbor portion 15 shown in FIG. 3 prevents invasion of dust and the like to sealing space which receives the image pick up element unit 16. Note that, the image pick up element neighbor portion 15 may remove dust adhered to said filter portion 18 without vibrating the filter portion 18 which is mentioned as follows. Thus, the filter portion 18 is fixed to the case 12 without movably, and a mounting constitution of the filter portion 18 to the case 12 is simple. Also, the sealed space which receives the image pick up element unit 16 is certainly sealed by the filter portion 18, the case 12 and the unit fixing base plate 14.

The filter portion 18 has a multilayer structure which is composed of a four multi layered filters wherein an antidust filter 36, an infrared ray absorbing glass plate 32, a crystal wavelength plate 34 and a second birefringence plate 30 are laminated. As for a laminating method, it may be adhesive bond laminating or other laminating method.

Figure 4A:
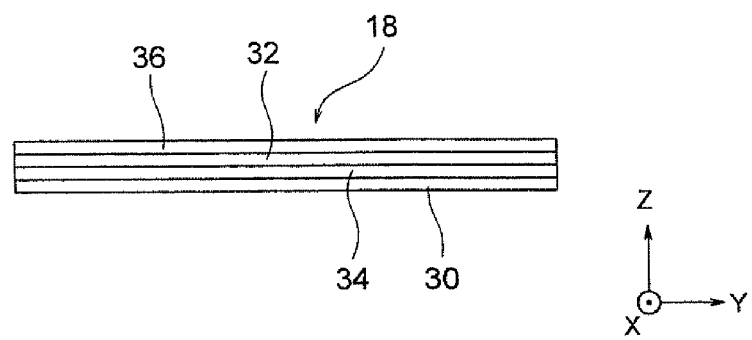
FIG. 4a to FIG. 4c are schematic cross sectional views of filter portion equipped at the neighboring part of the image pick up element.
Figure 4B:
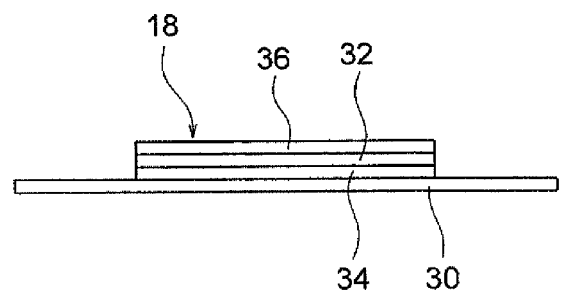
Figure 4C:
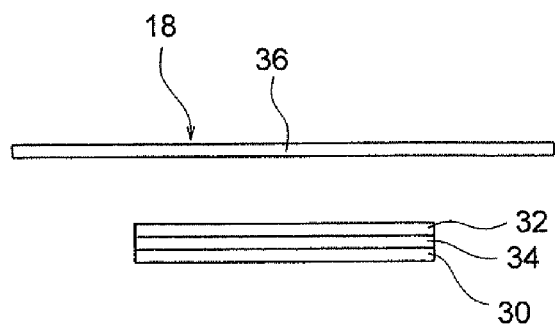

As shown in FIG. 4a, although the filter portion 18 according to the present embodiment is formed by laminating four filter having a substantially identical area, as for shape of the filter portion 18, it is not limited thereto. For example, a filter portion 18 according to an alternate embodiment shown in FIG. 4b, an area of one filter (the second birefringent plate 30) is larger than other three filters 36, 32, 34. Also, a filter portion 18 according to an alternate embodiment shown in FIG. 4c, one filter (the antidust filter 36) becomes an individual body from the other three filters 32, 34, 30.

The crystal wavelength plate 34 shown in FIG. 3 is an optical plate which is available to change a linearly polarized light to a circularly polarized light, the infrared ray absorbing glass plate 32 has function to absorb an infrared ray. Also, the antidust filter 36 is a birefringent plate (a first birefringent plate) whose birefringent direction is mutually different at 90 degree with the second birefringent plate 30, when one is a birefringent plate having 90 degree birefringent direction (a short side direction), other birefringent plate is a birefringent plate having 0 degree birefringent direction (a long side direction). In the present embodiment, although the antidust filter 36 is a birefringent plate having 0 degree birefringent direction (a long side direction), the second birefringent plate 30 is a birefringent plate having 90 degree birefringent direction (a short side direction), it may be reversed.

In the present embodiment, an optical low pass filter (OPLF) is basically composed of the antidust filter 36 and the second birefringent plate 30 at the filter portion 18. Note that, generally the optical low pas filter (OPLF) is composed by that the infrared ray absorbing glass plate 32 and the crystal wavelength plate 34 are laminated between two birefringent plates 36 and 30.

The antidust filter 36 and the second birefringent plate 30 are produced by using a crystal plate which is cut out from a crystal with a specific angle. A raw material crystal may be either an artificial crystal or a natural crystal.

Figures 6A, 6B:
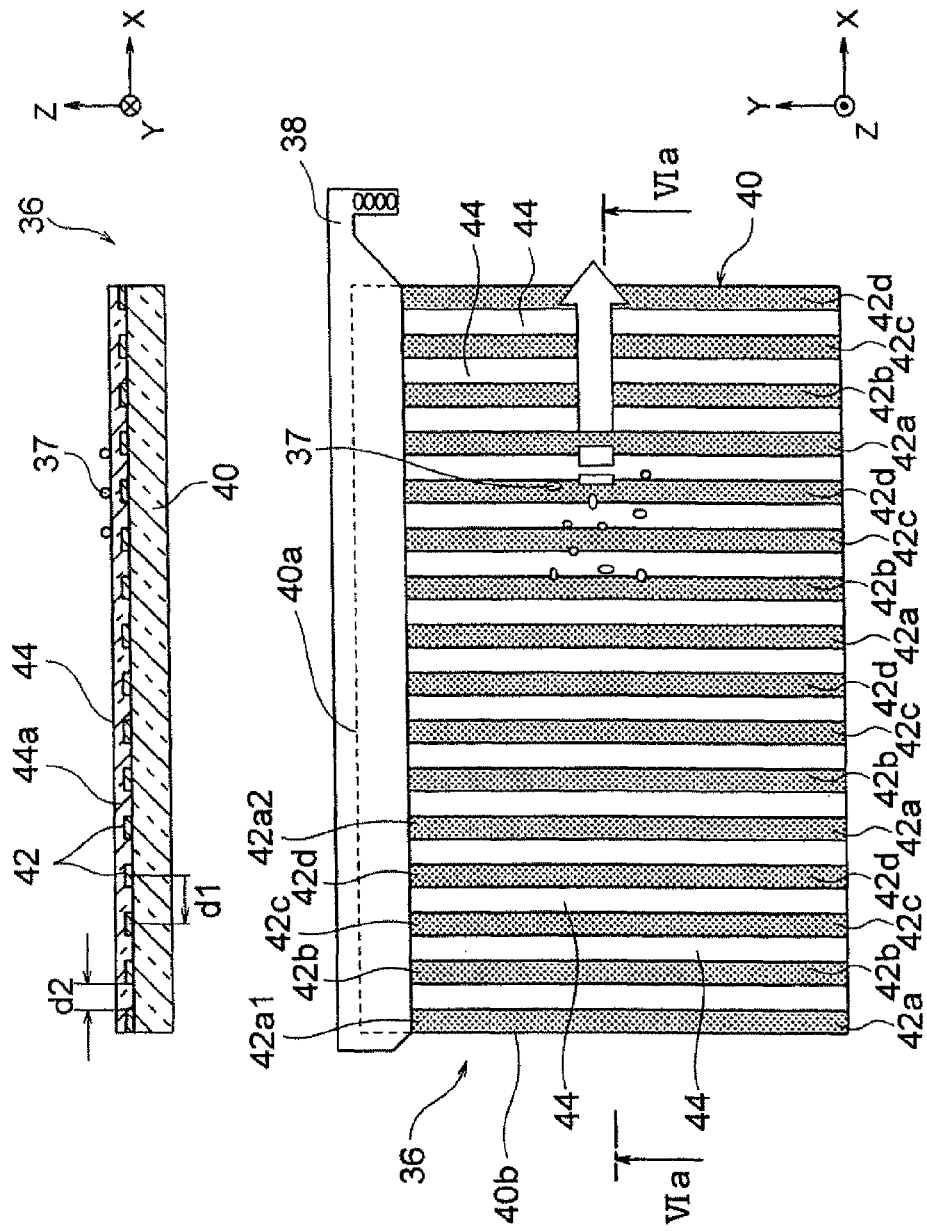
FIG. 6a and FIG. 6b are a cross sectional view and a plane view of an anti dust filter which is equipped to the neighboring part of the image pick up element shown in FIG. 3.

FIG. 6a and FIG. 6b are a cross sectional view and a plane view of an anti dust filter which is equipped at the neighboring part 15 shown in FIG. 3. As shown in FIG. 6a, the antidust filter 36 comprises a base member portion 40, a plurality of electrodes 42 and a surface layer 44. The base member portion 40 has a rectangular shape and a light passing area 40c (FIG. 2) which is available to pass through a light towards to the image pick up element unit 16 provided at the Z-axis negative direction side. The base member portion 40 at the antidust filter 36 is a birefringent plate having birefringent property.

For example, the electrode 42 and the surface area 44 preferably comprise transmittance values which are same level with the base member portion 40. For example, the electrode, 42, the surface layer 44 and the base member portion 40 preferably have 80% or more and 100% or less transmittance values at whole area of an input visible light (for example, light having wavelength which is 0.38 μm or more, 0.75 μm or less). Because, it can be obtained a sufficient optical property for obtaining captured images such as still image, motion picture and the like, when the transmittance vale is 80% or more and 100% or less. More preferably, the electrode 42, the surface layer 44 and the base member portion 40 have 90% or more and 100% or less the transmittance value at whole area of an input visible light. When the transmittance vale is 90% or more and 100% or less, sufficient optical property for obtaining high definition still image of captured images can be obtained.

Also, when amount of light is decreased, which is reached to the image pick up element unit 16 by the light passes through the electrode 42, the surface 44 and the base member portion 40, the amount of light of the captured image may be increased substantially by processing (analogue processing or digital processing) a signal obtained by the image pick up element unit 16.

As shown in FIG. 6*a*, a plurality of electrodes 42 is formed on a surface of the Z-axis positive direction side of the base member portion 40. The electrode 42 is formed by a material which passes light for example, ITO (indium tin oxide), ZnO (zinc oxide) and the like. The electrode 42 is formed on whole surface of the base member portion 40 which includes light passage area 40*c*, and generates an electric field to remove dust adhered to a surface of the antidust filter 36 which is mentioned as follows. As shown in FIG. 6*b*, the electrode 42 is formed as stripe shape along with the surface of the base member portion 40. In the antidust filter 36 according to the present embodiment, the electrode 42 is formed as extends to a direction which is a substantially parallel to a short side 40*b* of the base member portion 40. Note that, the electrode 42 is provided substantially parallel to the image pick up face 16*a* of the image pick up element unit 16 shown in FIG. 3. By arranging the electrode 42 substantially parallel to the image pick up face 16*a*, a light passing area 40*c* (FIG. 2) can be covered efficiently by the electric field by the electrode 42 which is mentioned as follows.

The plurality of the electrode 42 is arranged with spaces along with a long side 42*a* of the base member portion 40 so that for example, a pitch is a predetermined length d1 and respective spaces become a length d2 (FIG. 6*a*). As shown in FIG. 6*b*, a wiring portion 38 is attached to one end portion of the respective electrode 42 (end portion of a Y-axis positive direction side in the present embodiment), and the electrode 42 are electrically connected to the voltage signal output circuit 28 shown in FIG. 1 through the wiring portion 38. Although the wiring portion 38 according to the present embodiment is FPC, it is not particularly limited if conducting the voltage signal to the electrode 42.

Also, the plurality of electrodes 42 is constituted by a plurality of groups to which AC voltage having different phases respectively are applied. Namely, the plurality of the electrode 42 in the present embodiment is composed of a first group electrode 42*a* to which a first voltage signal is input, a second group electrode 42*b* to which a second voltage signal is input, a third group electrode 42*c* to which a third voltage signal is input and a fourth group electrode 42*d* to which a fourth voltage signal is input.

The electrodes 42*a*, 42*b*, 42*c*, 42*d* of the respective groups are arranged periodically with predetermined spaces along a X-axis direction which is perpendicular to the Y-axis direction which is a direction where the electrodes 42 extend to, in the order of the first group electrode 42*a*, the second group electrode 42*b*, the third group electrode 42*c*, the fourth group electrode 42*d*. Namely, between the one first group electrode 42*a*1 and one first group electrode 42*a*2 to which a same phase voltage signal is applied, one second group electrode 42*b*, one third group electrode 42*c*, one fourth group electrode 42*d* to which different voltage signals from the first group electrode 42*a* are applied, are provided with spaces respectively. With respect to the second group electrode 42*b*, the third group electrode 42*c*, the fourth group electrode 42*d* are similar with the first group electrodes 42*a*1, 42*a*2.

The antidust filter 36 according to the present embodiment comprises a surface layer 44 which is provided on a surface of a Z-axis negative direction side of the antidust filter 36 to cover a surface of the electrode 42 (FIG. 6*a*). The surface layer 44 is provided so as to sandwich the electrode 42 with the base member portion 40. The surface layer 44 is formed by a light passing material having insulation property.

A refraction index of the surface layer 44 is preferably substantially equal to a refraction index of the electrode 42. Also, light dispersion at the surface layer 44 (refraction index change by light wave length) is preferably substantially equal to light dispersion at the electrode 42. The antidust filter 36 having the surface layer 44 wherein an optical property is substantially equal to the electrode 42 can prevent unwanted reflection of a shadow of the electrode 42 to the image taken by the image pick up element unit 16. Also, the surface layer 44 may comprise repellency, when the surface layer 44 has repellency, an adhering force of the dust 37 to the antidust filter 36 can be reduced. Also, the surface layer 44 may comprise fine concavity and convexity, when the surface layer 44 has fine concavity and the convexity, an adhesive force of the dust 37 (intermolecular force) to the antidust filter 36 can be reduced.

FIG. 7 is a schematic view for explaining dust removing operation by using the anti dust filter 36. The voltage signal output circuit 28 comprises a signal generating portion 82, a phase adjusting portion 84 and an amplifying portion 86. The signal generating portion 82 generates AC voltage signal having predetermined cycle and outputs to the phase adjusting portion 84. The phase adjusting portion 84 adjusts a phase of the AC voltage signal, generates four AC voltage signals which are different phases respectively, and outputs to the amplifying portion 86.

The amplifying portion 86 amplifies the four AC voltage signal to predetermined amplitude, then, outputs as driving voltage signals. The amplifying portion 86 outputs the driving voltage signals to the electrode 42 which is equipped to the antidust filter 36 through the wiring portion 38. Thus, the voltage signal output circuit 28 may output a first driving voltage signal ch1, a second driving voltage signal ch2, a third driving voltage ch3 and a fourth driving voltage signal ch4 which are different phases each other to the electrode 42 equipped to the antidust filter 36.

The wiring portion 38 comprises a first wiring portion 38*a* which conducts the first driving voltage signal ch1 to the first group electrode 42*a*, a second wiring portion 38*b* which conducts the second driving voltage signal ch2 to the second group electrode 92*b*, a third wiring portion 38*c* which conducts the third driving voltage signal ch3 to the third group electrode 42*c*, a fourth wiring portion 38*d* which conducts the fourth driving voltage signal ch4 to the fourth group electrode 42*d*.

The first to the fourth driving voltage signals ch1 to ch4 are square waves which have quarter cycle of phase shift respectively, voltage signals to be output to the electrode 42 are not limited thereto, they may be signals such as a sine wave and triangular wave. Although frequencies of the first to the fourth driving voltage signals ch1 to ch4 are not particularly limited, for example, dust can be efficiently moved by setting 1 Hz to 500 Hz.

The voltage signal output circuit 28 can change an electric field of a surface of the antidust filter 36 by applying voltage to the plurality of electrodes 42 equipped on the surface of the antidust filter 36. The antidust filter 36 according to the present embodiment may generate an electric field of travelling waves on the surface of the antidust filter 36, because the electrodes 42 which passing through the light are arranged as stripe pattern and quadrature phase AC voltage are applied to the electrodes 42.

Namely, the electrodes 42*a*, 42*b*, 42*c* and 42*d* of each group are arranged periodically along the X-axis direction, the driving voltage signals ch1, ch2, ch3 and ch4 corresponding respect electrodes are applied to the electrodes 42*a*, 42*b*, 42*c* and 42*d* of each group. Thereby, the electric field of travelling waves which moves along the X-axis direction occur on the antidust filter 36, the dust 37 exists on the surface of the antidust filter 36 is moved to a direction along the electric field of travelling waves moving direction and removed. For example, as shown by an arrow 39, the dust 37 adhered to the surface of the antidust filter 36 is shifted to a direction toward a moving direction of the electric field of traveling waves and removed from the surface of the antidust filter 36.

Although the quadrature phase driving voltage are applied to the electrodes 42 according to the present embodiment, the driving voltage signal applied to the electrodes 42 according to the present invention may be a single phase or two phase. Even in the case of a single phase, the dust exists on the surface of the antidust filter 36 can be moved by changing the electric field on the surface of the antidust filter 36. Also, in the case of two phase or more, the dust exists on the surface of the antidust filter 36 can be moved by moving the electric field on the surface of the antidust filter 36.

However, the driving voltage signal applied to the electrodes 42 are preferably three phase or more. The electric field of travelling wave can be generated easily on the antidust filter 36 by applying AC voltage signals to the electrodes 42 composed by three or more group periodically arranged, the applied AC voltage signals correspond to the respective groups. A moving direction controlling of the dust 37 becomes easier by generating the electric field of travelling waves, also, the dust 37 can be shifted widely by comparatively small voltage. Note that, in the embodiments shown in drawings, it has been specified with an example of using 4 groups electrodes, however, the electrode group may be 2 groups, 3 groups, 5 groups or more.

Figure 5:
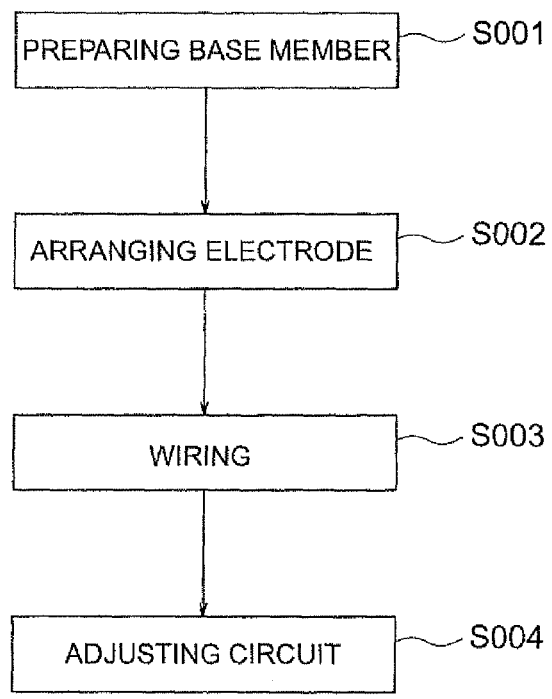
FIG. 5 is a flow chart showing one example of manufacturing process of the optical device according to the present invention.

FIG. 5 is a flow chart showing one example of manufacturing process of the optical device according to the present embodiment. In a step S001 shown in FIG. 5, the base member portion 40 shown in FIG. 6*a* is prepared. Although the base member portion 40 shown in FIG. 6*a* is a birefringent plate having birefringent property, as for the base member portion 40 in the antidust filter 36, it is not limited thereto. For example, in case that the antidust filter 36 is used as a different optical member from the optical low pass filter, the base member portion 40 may be other transparent member such as a glass plate and the like. Also, a shape of the base member portion 40 is not limited to a rectangular shape, for example, it may be other shapes such as a circular plate shape and the like.

In a step S002, the electrode 42 is formed on the surface of the base member portion 40. As for a manufacturing method for the electrode, although it is not particularly limited, wet etching method, dry etching method, spin coat method and the like can be used. A pitch d1 (FIG. 6*a*) of the electrode 42 which is formed on the surface of the base member portion 40 may be designed appropriately in response to properties of the dust 37 having high possibility of adhering to the antidust filter 36, for example, it can be 200 µm to 1000 µm (1 mm) or so. Also, although a space d2 between neighboring electrodes is not particularly limited, for example, it can be 200 µm to 1000 µm (1 mm) or so.

Also in the step S002, the surface layer 44 is formed on a surface of the base member portion where the electrode 42 is formed. Further, in the step S002, an oscillation element 20 (FIG. 12*a* and FIG. 12*b*) may be arranged on the base member portion, if necessary. The oscillation element 20 is fixed to the base member portion 40 by adhesive and the like.

Figure 9:
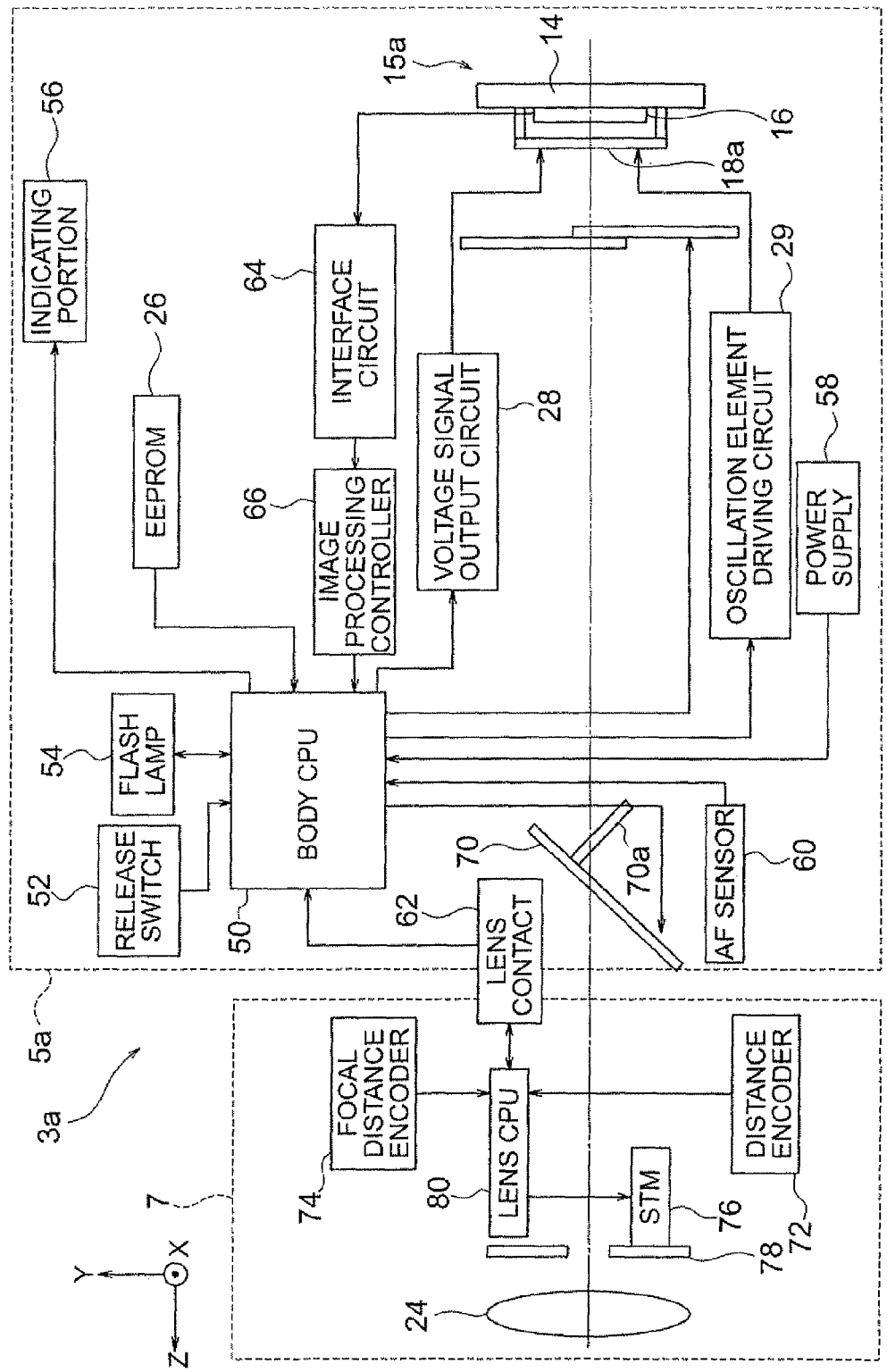
FIG. 9 is a whole block diaphragm of a camera to which an optical device according to third embodiment of the present invention is equipped.

Further, in a step S003, the wiring portion 38 shown in FIG. 6*b* is equipped to electrically connect the electrode 42 and the voltage signal output circuit 28 (FIG. 1) by the wiring portion 38. Note that, in the step S002, in case that the oscillation element 20 (FIG. 12*a* and FIG. 12*b*) is arranged on the base member portion 40, an oscillation element driving circuit 29 shown in FIG. 9 is electrically connected with the oscillation element 20 in the step S003. In a step S004, the voltage signal output circuit 28 (FIG. 1) is adjusted so as to output periodical voltage to the electrode 42 shown in FIG. 6. An oscillation of the voltage to be output to the electrode 42 may be designed appropriately in response to properties of the dust 37 having high possibility to adhere with the antidust filter 36 and the pitch d1 of the electrode 42 and the like, for example, it can be 100Vp-p~2 kVp-p. Note that, in case that the oscillation element 20 (FIG. 12*a* and FIG. 12*b*) is arranged on the base member portion 40 in the step 5002, the oscillation element driving circuit 29 may be adjusted so as to generate nodes of oscillation (FIG. 13) at least one part of neighbor of the electrode 42, in the step S004.

An optical device according to the present embodiment removes dust adhered to the surface of the antidust filter 36 by shifting with changing electric fields. Due to forces given to the dust by the electrical fields are proportional to the charging amount of the dust under a predetermined condition, the optical device according to the present embodiment can remove the dust having large charging amount which has been hard to remove by a method of generating physical oscillation to an antidust filter.

Also, due to the optical device according to the present embodiment shifts the dust by electrical forces, it is possible to remove a dust of small mass which has been hard to remove by a method of generating physical oscillation to an antidust filter. Also, the optical device according to the present embodiment has excellent silence, because it is possible to remove the dust without generating physical generation. Further, it is not likely to raise the dust by the antidust filter 36 itself.

Due to the optical device according to the present embodiment shifts the dust by electrical force, it is not necessary to provide the antidust filter 36 with oscillation possible status which is different from a conventional art for removing the dust with generating physical oscillation. Thus, because the filter portion 18 including the antidust filter 36 can be equipped to the case 12 without movably, it is possible to prevent invasion of the dust from a gap between the filter 18 and the case 12 efficiently to the sealing space. Further, it is not necessary to equip the antidust filter with intervening elastic member and the like to the case 12, there is no risk that changing the dust removing property by aged deterioration and the like of the elastic member.

Second Embodiment

FIG. 8a and FIG. 8b are a cross sectional view (FIG. 8a) and a plane view (FIG. 8b) of an anti dust filter 36a in an optical device according to a second embodiment of the present invention. The optical device according to the second embodiment is similar with the optical device according to the first embodiment other than arrangement of a plurality of electrode 92 on the antidust filter 36a is different.

The antidust filter 36a comprises a base member portion 40 having a shape of a rectangular plate, a plurality of electrodes 92 and a surface layer 94. The electrode 92 is formed on a surface of a Z-axis negative side of the base member portion 40 which is different from the electrode 42 according to the first embodiment. Also, the electrode 92 is formed as extending to a direction substantially parallel to a long side 40a of the base member portion 40.

The plurality of the electrodes 92 is arranged with spaces along with a short side 40b of the base member portion 40 so that respective spaces become a predetermined length. A wiring portion 38 is attached to one end portion of the respective electrode 92 (end portion of a X-axis positive direction side in the present embodiment). The electrodes 92 are electrically connected to the voltage signal output circuit 28 through the wiring portion 38.

In the antidust filter 36a according to the present embodiment, the electrode 92 is formed on a surface of image pick up element unit 16 side (the Z-axis negative direction side) of surfaces of the base member portion 40. In the antidust filter 36 according to the present embodiment, the dust 37 adheres mainly to a surface of the Z-axis positive side of the base member portion 40. However, a force of electric field generated by output of voltage to the electrode 92 reaches to an opposite side of the base member portion 40.

Therefore, as similar with the first embodiment, the optical devise according to the present invention can change the electric field of a surface which is opposite side from the image pick up element unit 16 side at the antidust filter 36a, thereby the dust 37 adhered on the surface of the antidust filter 36a can be removed by shifting the dust 37.

Also, the plurality of electrodes 92 is constituted by a plurality of groups to which AC voltage having different phases respectively are applied. Namely, the plurality of the electrodes 92 in the present embodiment is composed by a first group electrode 92a to which a first voltage signal is input, a second group electrode 92b to which a second voltage signal is input, a third group electrode 92c to which a third voltage signal is input and a fourth electrode 92d to which a fourth voltage signal is input.

The electrodes 92a, 92b, 92c, 92d of the respective groups are arranged periodically along a short side direction (Y-axis direction) of the base member portion 40, driving voltage signals which correspond to the respective phases are applied to the electrodes 92a, 92b, 92c, 92d of the respective groups which is similar with the first embodiment. Thereby, an electric field of travelling waves moving along the Y-axis direction, which is a periodical arranging direction of the electrodes 92, is generated on the surface of the antidust filter 36a. Thus, the dust exists on the surface of the antidust filter 36a is shifted by electrostatic force provided from the electric field of travelling waves and is removed from the surface of the antidust filter 36a.

For example, the dust 37 adhered on the surface of the antidust filter 36a is shifted to a direction towards a moving direction of the electric field of travelling waves, e.g., shown by an arrow 95 (a direction along the Y-axis), and is removed from the surface of the antidust filter 36a. Because the optical device according to the present embodiment can shift the dust along the direction of the short side 40b of the base member portion 40 in the antidust filter 36a, a conveyance distance which is necessary for removing the dust 37 from the antidust filter 36a is smaller with respect to the antidust filter 36 according to the first embodiment. Thus, the optical device according to the second embodiment can remove the dust 37 adhered on the surface of the antidust filter 36a more efficiently. Further, the optical device according to the present embodiment performs similar effects with the optical device according to the first embodiment.

Third Embodiment

FIG. 9 is a whole block diaphragm of a camera 3a to which an optical device according to third embodiment of the present invention is equipped. In the camera 3a, an oscillation element driving circuit 29 is equipped to a camera body 5a, the camera 3a is different in a image pick up element neighbor portion 15a equipped to the camera body 5a, the camera 3a is similar with the camera 3 shown in FIG. 1 other than that difference.

The oscillation element driving circuit 29 is equipped to the camera body 5a. The oscillation element driving circuit 29 is electrically connected with a body CPU 50 and the image pick up element neighbor portion 15a. The oscillation element driving circuit 29 can drive an oscillation element 20 (FIG. 10) which is provided at the image pick up element neighbor portion 15a with receiving control from the body CPU 50.

Figure 10:
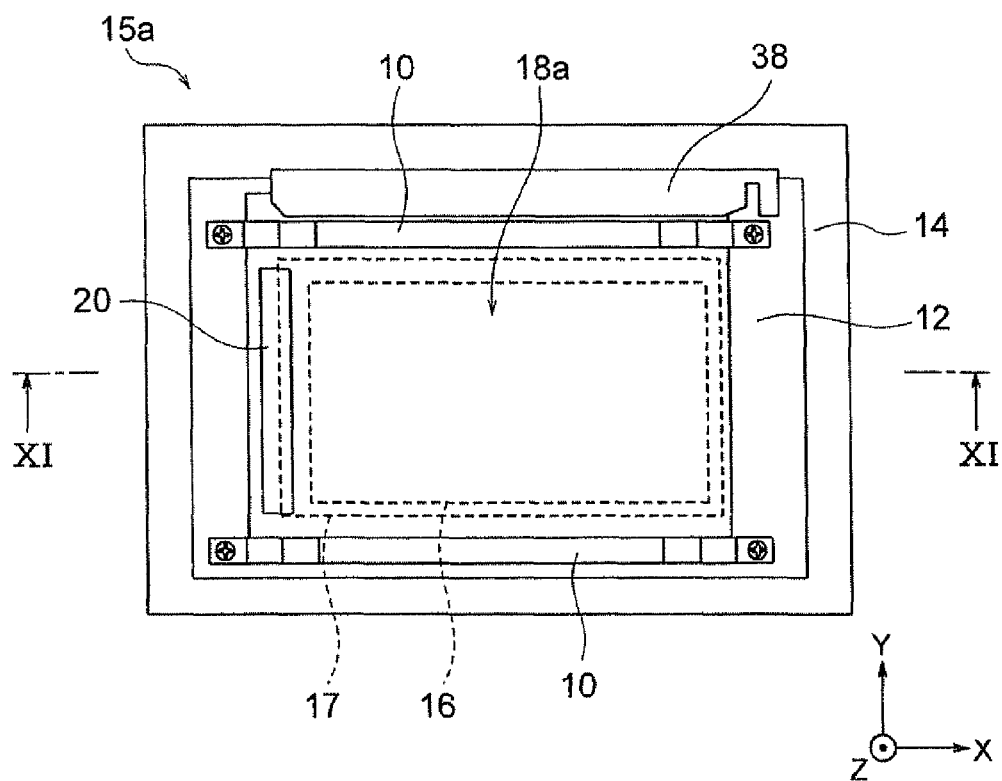
FIG. 10 is a plain view of a neighboring part of an image pick up element equipped to the camera shown in FIG. 9.

FIG. 10 is a plain view of an image pick up element neighbor portion 15a equipped to the camera 3a shown in FIG. 9. The image pick up element neighbor portion 15a comprises a unit fixing base plate 19, a case 12, a filter portion 18a and an image pick up unit 16. Also, the image pick up element neighbor portion 15a comprises a compression member 10 for attaching an antidust filter 36b (FIG. 11) to the case 12, a wiring portion 38 which is attached to a filter portion 18a and the oscillation element 20.

Figure 11:
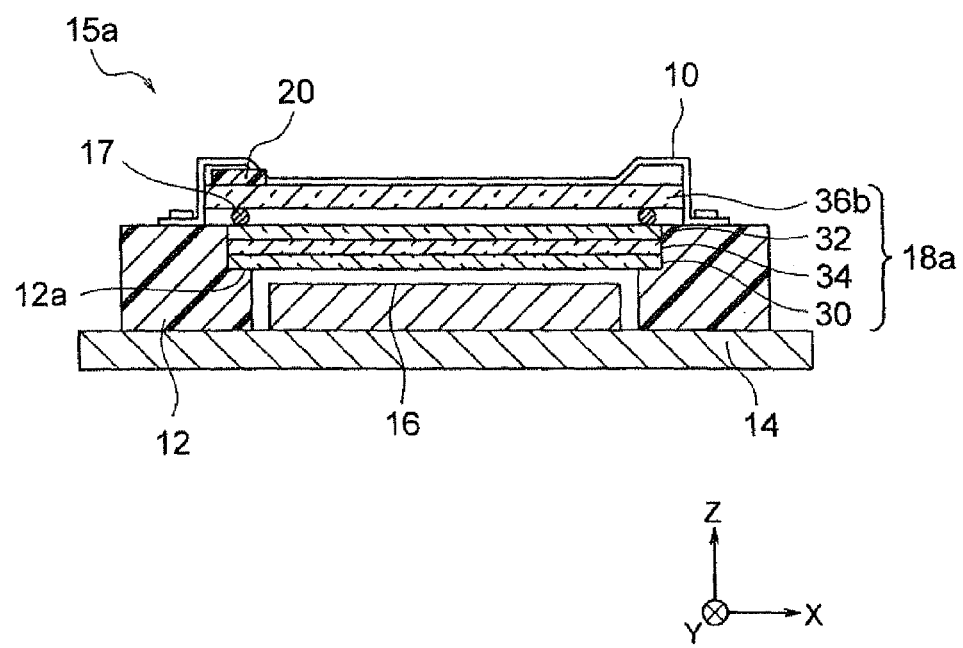
FIG. 11 is a cross sectional view of neighboring part of the image pick up element along a line XI-XI shown in FIG. 10.

As shown in FIG. 11 which is a cross sectional view of the image pick up element neighbor portion 15a, the image pick up element 16 and the case 12 are arranged on a surface of a Z-axis positive side of the unit fixing base plate 19 which has a rectangular shape. The case 12 has an architrave shape and is arranged as enclosing a peripheral of the image pick up element unit 16. The case 12 is formed by using a material having insulating property such as synthetic resin, ceramics and the like.

A mounting portion 12a so as to mount the filter portion 18 is formed on an internal circumferential face of the case 12. In the filter portion 18 in the present embodiment, the antidust filter 36b becomes an individual body from an infrared ray absorbing glass plate 32, a crystal wavelength plate 34 and a second birefringence plate 30 which are other three sheets filter. The three filters 32, 34, 30 other than the antidust filter 36b are attached to a mounting portion 12a of the case 12. These three filters 32, 34, 90 are mounted to the case 12 by, for example, adhesive bonds and the like.

A peripheral of the image pick up element unit 16 is sealed by the unit fixing base plate 14, the case 12 and the filter portion 18a to prevent invasion of dust and the like to sealing space which receives the image pick up element unit 16.

The antidust filter 36b is arranged at a Z-axis negative direction side of the infrared ray absorbing glass plate 32 with sandwiching sealing member 17 between said infrared ray absorbing glass plate 32 and the antidust filter 36b. The sealing member 17 is composed by an elastic member such as synthetic resin or rubber and the like and seals the space between the antidust filter 36b and the infrared ray absorbing glass plate 32.

The antidust filter 36b is attached to the case 12 by the compression member 10 having flat spring shape with a status that oscillation is available. Namely, the compression member 10 pressurizes the antidust filter 36b towards the infrared ray absorbing glass plate 32 from the Z-axis positive side, and maintains the antidust filter 36b by sandwiching between the sealing member 17 and the compression member 10. Note that, both end portions of the compression member 10 are fixed by screw to the case 12 as shown in FIG. 10 and FIG. 11.

Figure 12A:
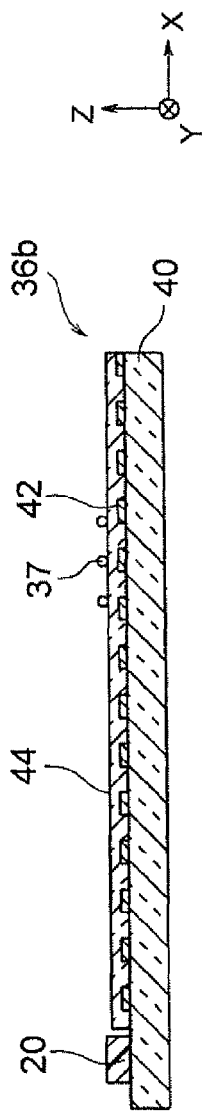
FIG. 12a and FIG. 12b are a cross sectional view and a plane view of an anti dust filter which is equipped at the image pick up element neighbor portion shown in FIG. 10.
Figure 12B:
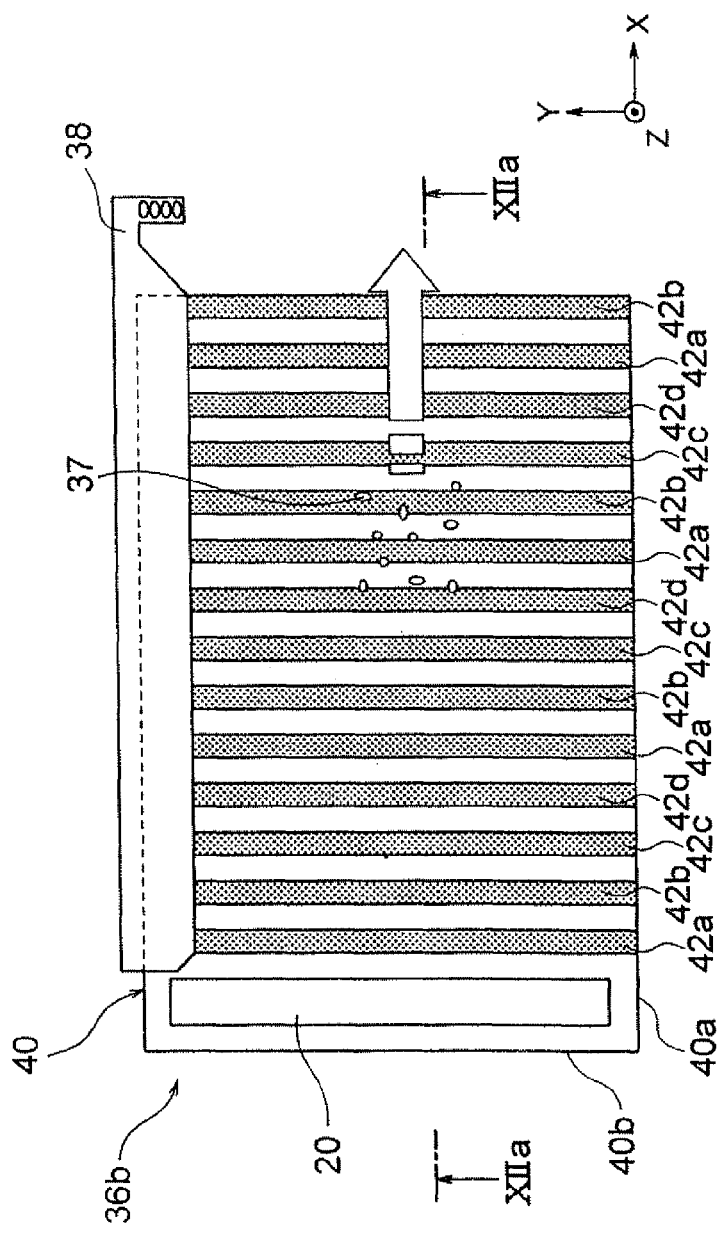

FIG. 12a and FIG. 12b are a cross sectional view (FIG. 12a) and a plane view (FIG. 12b) of the anti dust filter 36b which is equipped at the image pick up element neighbor portion 15a shown in FIG. 10. As shown in FIG. 12a, the antidust filter 36b comprises a base member portion 40, a plurality of electrodes 42 and a surface layer 44. Also, an oscillation element 20 is attached to a surface of the Z-axis positive side at the antidust filter 36b.

The oscillation element 20 comprises a piezoelectric element and an electrode and the like for applying voltage to the piezoelectric element, the oscillation element 20 is driven by an oscillation element driving circuit 29 shown in FIG. 9. The oscillation element driving circuit 29 can drive the oscillation element 20 so as to generate vibration nodes to the antidust filter 36b as shown in FIG. 13. The oscillation element driving circuit 29 according to the present invention can drive the oscillation element 20 so that, for example, the antidust filter 36b generates third bending vibration.

A plurality of electrodes 42 are formed on a surface of the Z-axis positive direction side of the base member portion 40 according to the third embodiment as similar with the antidust filter 36 shown in FIG. 6a and FIG. 6b. The electrodes 42 are formed as stripe pattern along the surface of the base member portion 40 as shown in FIG. 12b. In the antidust filter 36b according to the present embodiment, the electrodes 42 are formed so as to extend to a direction which is substantially parallel to a short side 40b of the base member portion 40. Also, the electrodes 42 are provided substantially parallel to nodes of vibration 99 shown in FIG. 13.

Because an electric field having inclination to a direction which is substantially vertical to the nodes of vibration 99 by providing the electrodes 42 substantially parallel to the nodes of vibration 99, the antidust filter 36b can move the dust 37 to a direction which is substantially vertical to the nodes of vibration (the X-axis direction). Thus, the optical device having the antidust filter 36b can remove the dust of whole surface of the antidust filter 36b with shifting the dust 47 remains peripheral of the nodes of the vibration 99 to a direction away from the nodes of vibration 99 (a substantially vertical direction with the nodes of vibration) by a single mode curvature vibration.

Also, because the oscillation element 20 on the antidust filter 36b is provided substantially parallel to the short side 40b of the base member portion 40 too, in the optical device according to the present embodiment, the oscillation element 20 and the electrodes 42 are provided as substantially parallel. Because the nodes of vibration are often generated to a direction which is substantially parallel to the oscillation element 20 and to a direction which is substantially parallel to a side of the base member portion 42, it is preferable to locate the electrodes 42 substantially parallel to the side of the base member portion 40 or to the oscillation element 20 for removing the dust on whole surface of the antidust filter 36b.

A wiring portion 38 is attached at end portions of the Y-axis positive side of the respective electrodes 42, the electrodes 42 are electrically connected with the voltage signal output circuit 28 shown in FIG. 1 via the wiring portion 38. Also, the plurality of electrodes 42 in the present embodiment are composed of a first group electrode 42a to which a first voltage signal is input, a second group electrode 42b to which a second voltage signal is input, a third group electrode 42c to which a third voltage signal is input and a fourth group electrode 42d to which a fourth voltage signal is input as similar with the first embodiment shown in FIG. 7.

The electrodes 42a, 42b, 42c, 42d of the respective groups are arranged periodically with predetermined spaces along a X-axis direction which is perpendicular to the Y-axis direction which is a direction where the electrodes 42 extend to, in the order of the first group electrode 42a, the second group electrode 42b, the third group electrode 42c, the fourth group electrode 42d.

Figure 19:
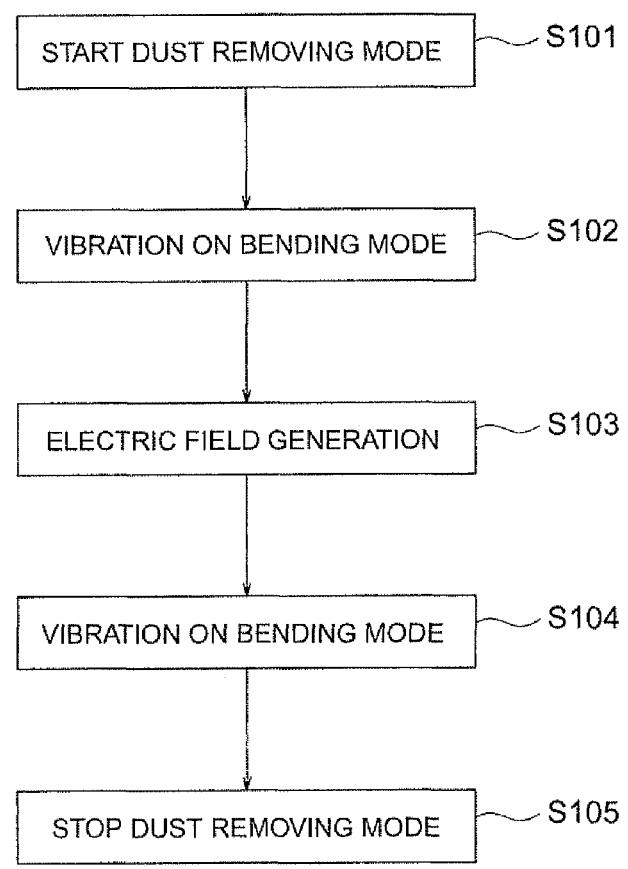
FIG. 19 is a flow chart showing one example of dust removing operation by an anti dust filter shown in FIG. 12.a and FIG. 12b

FIG. 19 is a flow chart showing one example of dust removing performance by the camera 3a (FIG. 9) having the antidust filter 36b shown in FIG. 12a and FIG. 12b. In a step S101, dust removing performance is commenced to remove the dust 37 adhered on the antidust filter 36b. The antidust removing performance is commenced, for example, when an electric source of the camera 3a shown in FIG. 9 is ON, or a cleaning commence signal is input from an input portion equipped not shown in the camera body 5a to a body CPU 50.

In a step S102, a control signal is output from the body CPU 50 shown in FIG. 9 to the oscillation element driving signal circuit 29, the oscillation element 20 is driven by the oscillation element driving circuit 29 so as to vibrate the antidust filter 36b. FIG. 13 is a schematic view of a first step (step S102) at dust removal performance by the anti dust filter 36b shown in FIG. 12a and FIG. 12b.

In the step S102, the oscillation element 20 is driven by the oscillation element driving circuit 29 so that the antidust filter 36b generates third bending vibration. In the step S102, the dust 37 adhered to the antidust filter 36b can be removed except for the dust adhered at a neighborhood of the nodes of vibration 99. However, there is a case that the dust adhered on the neighbor of the nodes of vibration 99 cannot be removed sufficiently as shown in FIG. 13, because a neighborhood 101 of the nodes of vibration 99 in bending vibration has small amplitude of vibration.

Figures 14A, 14B:
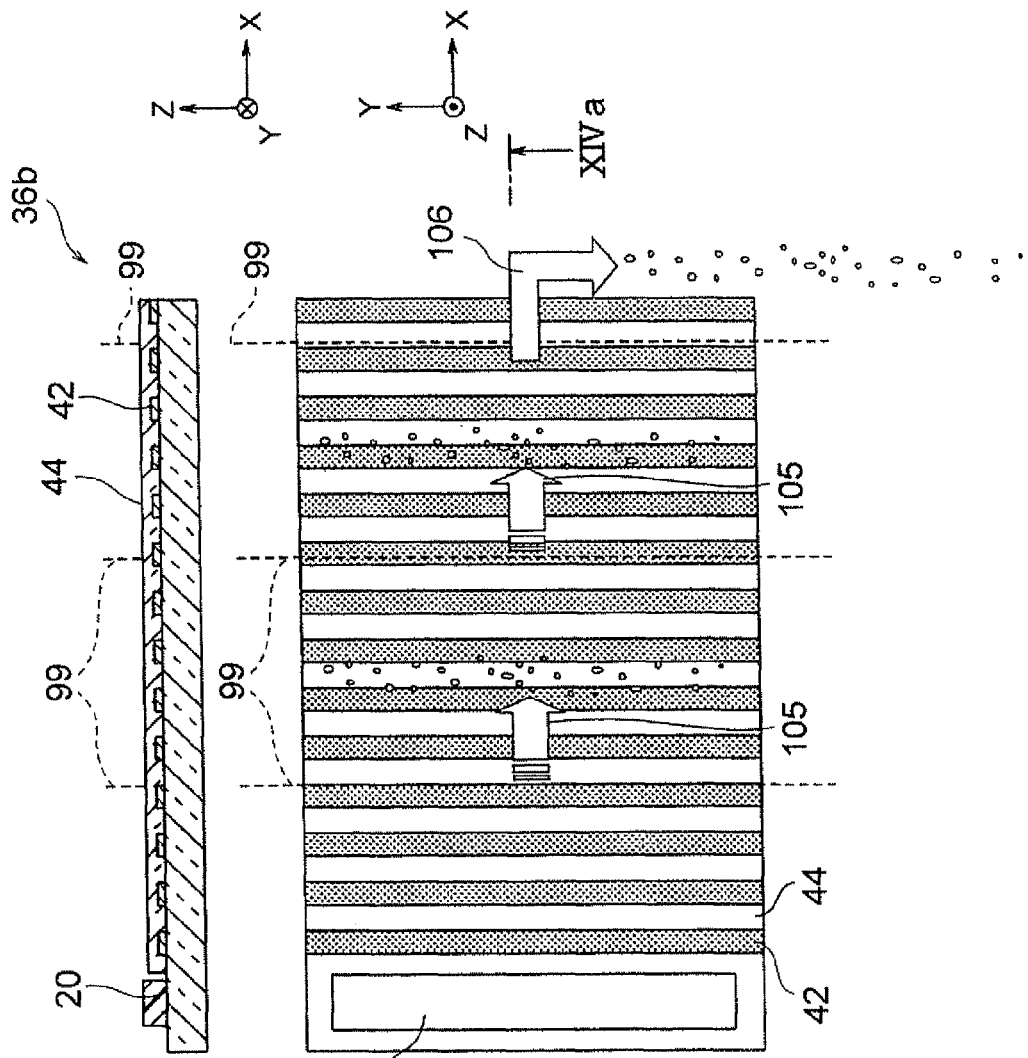
FIG. 14a and FIG. 14b are schematic views of a second step, at dust removal performance by the anti dust filter of shown in FIG. 12.

In a step S103 shown in FIG. 19, the control signal is output from the body CPU 50 shown in FIG. 9 to the voltage signal output circuit 28, the voltage signal output circuit 28 outputs voltage signals to the electrodes 42 so as to generate an electric field of travelling waves on the surface of the antidust filter 36b. FIG. 14a and FIG. 14b are schematic views of a second step (step S103) at dust removal performance by the anti dust filter 36b of shown in FIG. 12a and FIG. 12b.

In the step S103, the voltage signal output circuit 28 changes the electric field of the surface of the antidust filter 36b by applying voltage to the plurality of electrodes provided on the surface of the antidust filter 36b. The voltage signal output circuit 28 generates, as similar with FIG. 7, the electric field of travelling waves which move along with the X-axis direction by applying four phase AC voltage signal ch1 to ch4 to the electrodes 42 arranged as stripe pattern (FIG. 14a and FIG. 14b).

On the surface of the antidust filter 36b, the dust 37 remains at neighborhood of a position where the nodes of vibration 99 generated at the bending vibration in the step S102 is moved along the X-axis direction as shown by an arrow 105 by an electrostatic force supplied form the electric field, as shown in FIG. 14b. The voltage signal output circuit 28 can apply voltage to the electrodes 42 until the dust 37 which is remain is at a neighborhood of a position where the nodes of vibration 99 generated, moves to a position away from the nodes of vibration 99. Note that, in the step S102, a part of the dust which is remains at a neighborhood 100 of a position where the nodes of vibration 99 generated is removed from the surface of the antidust filter 36b at the steps S103 as shown by an arrow 106.

Figure 15:
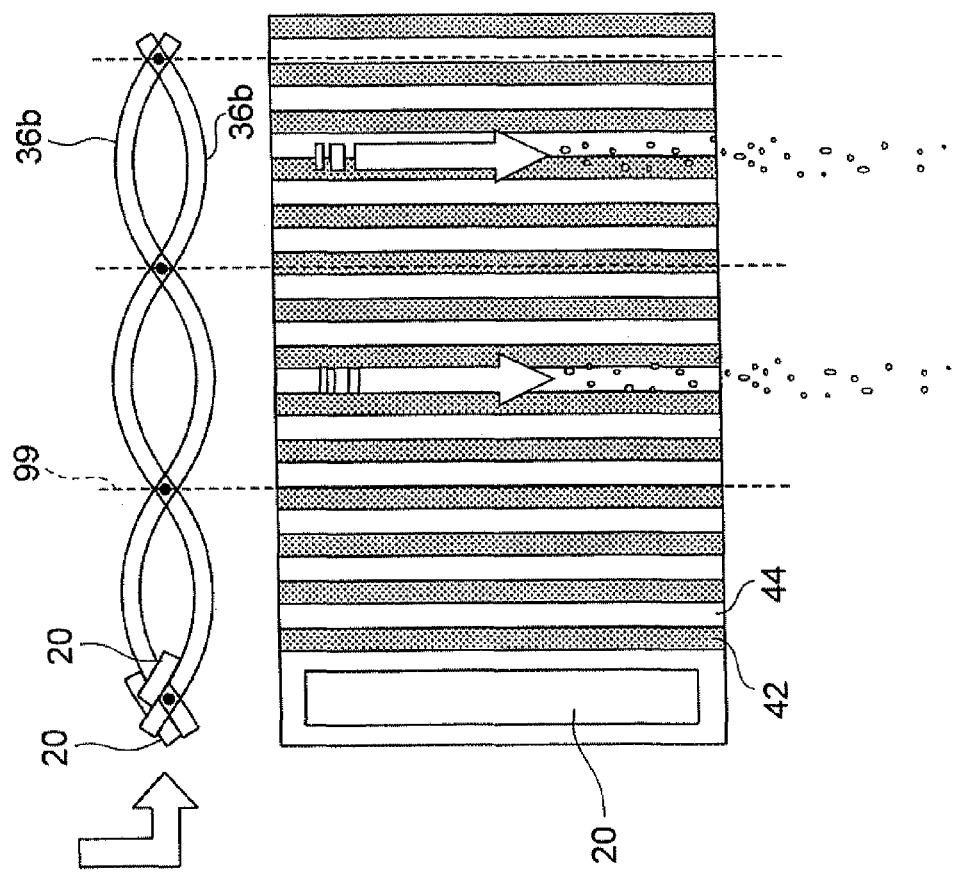
FIG. 15 is a schematic view of a third step at dust removal performance by the anti dust filter of shown in FIG. 12a and FIG. 12b.

In a step S104, as similar with the step S102, the control signal is output from the body CPU 50 shown in FIG. 9 to the oscillation element driving circuit 29, the oscillation element 20 is driven by the oscillation element driving circuit 29 so as to vibrate the antidust filter 36b. FIG. 15 is a schematic view of a third step (step S104) at dust removal performance by the anti dust filter 36b shown in FIG. 12a and FIG. 12b.

In the step S104, the oscillation element 20 is driven by the oscillation element driving circuit 29 so that the antidust filter 36b generates third bending vibration. Because the dust 37 remains on the surface of the antidust filter 36b is moved to a position away from the nodes of vibration 99 by the step S103, the dust 37 is removed by the bending vibration at the step S104. The dust 37 remains on the surface of the antidust filter 36b are removed by moving to gravity direction as shown by an arrow in FIG. 15.

In a step S105 shown in FIG. 19, the dust removal performance is finished. The body CPU 50 ceases the control for the voltage signal output circuit 28 and the oscillation element driving circuit 29 at the step S105.

In this manner, because the optical device according to the present embodiment can operate both the dust removing performance which causes bending vibration of the antidust filter 36b and the dust removing performance which causes changing the electric field of the surface of the antidust filter 36b, the dust 37 adhered to the surface of the antidust filter 36b can be removed efficiently. Namely, dust of relatively large mass, dust adhered to a portion other than a neighborhood of the nodes of vibration can be removed by the dust removing performance of the bending vibration. Also, dust of relative small mass, dust adhered to the neighborhood of the nodes of vibration, dust having large charging amount can be removed by the dust removing performance of the electric field of travelling waves.

The dust 37 which remains at a neighborhood of a position where the nodes of vibration 99 generate can be moved to a position away from the nodes of vibration 99, by which the voltage signal output circuit 28 outputs the voltage to the electrodes 42 so that the electric field generated on the antidust filter 36b can be shifted after the oscillation element 20 is driven by the oscillation element driving circuit 29. Thus, due to the optical device according to the present embodiment, the dust of whole surface of the antidust filter 36b can be removed by only a single mode bending vibration by combining both the dust removing performance to cause bending vibration and the dust removing performance to change an electric field.

Note that, in an example of the dust removing performance shown in FIG. 19, although the dust removing performance to cause bending vibration and the dust removing performance to change an electric field are performed alternately, as for the dust removing performance is not limited thereto, for example, the dust removing performance to cause bending vibration and the dust removing performance to change an electric field may be performed at the same time. Namely, when the oscillation element 20 is driven by the oscillation element driving circuit 29, the voltage signal output circuit 28 can output voltage to the electrodes 42 so as to move the electric field generated on the antidust filter 36b. Thereby, the optical device according to the present embodiment can remove the dust on the whole surface of the antidust filter 36b in a short period of time.

Further, although in the antidust filter 36b according to the present embodiment, as shown in FIG. 13, the electrodes 42 are formed at whole surface of the antidust filter 36b, an arrangement of the electrodes 42 is not limited thereto, the electrodes 42 may be formed at neighborhood of nodes of vibration 99 generating position only. An antidust filter having electrodes at the neighborhood of a position where the nodes of vibration 99 generated only is available to move the dust 37 which is adhered to the neighborhood of the nodes of vibration 99 to the position away from the nodes of vibration 99 so that the dust 37 is stayed at the position.

Fourth Embodiment

FIG. 16a and FIG. 16b are a cross sectional view (FIG. 16a) and a plane view (FIG. 16b) of an anti dust filter 36c in an optical device according to a fourth embodiment of the present invention. The optical device according to the fourth embodiment, it is similar with the optical device according to the third embodiment other than arrangement of a plurality of electrodes 92 at the antidust filter 36c is different.

The antidust filter 36c comprises a base member portion 40, the plurality of electrodes 92 and a surface layer 94. The electrode 92 is formed on a surface of a Z-axis negative direction side of the base member portion 40, which is different from the electrode 42 according to the third embodiment. Also, the electrode 92 is formed as extends to a direction which is a substantially parallel to a long side 40a of the base member portion 40.

In the antidust filter 36c of the present embodiment, the electrode 92 is formed on a surface of an image pick up element 16 side (Z-axis negative direction side) of surfaces of the base member portion 40. In the antidust filter 36c according to the present embodiment, dust 37 adheres mainly to a surface of a Z-axis positive direction of the base member portion 40. However, a force of an electric field generated by outputting voltage to the electrode 92 reaches to an opposite side of the base member portion 40.

Therefore, the optical device according to the present embodiment, as similar with the third embodiment, an electric field, which is an opposite side to an image pick up element unit 16 side at the antidust filter 36c, can be changed, thereby the dust 37 adhered to the surface of the antidust filter 36 can be moved and removed.

In the optical device according to the present embodiment, an oscillation element 20 and the electrodes 92 area substantially vertically arranged. Even though such arrangement, a voltage signal driving circuit 28 can move the dust 37 which remains at a neighborhood of nodes of vibration 99, to the Z-axis direction as shown by an arrow 107 in FIG. 16b. Thus, at the optical device of the present embodiment, as similar with the optical device of the third embodiment, the dust adhered to whole surface of the antidust filter 36c can be removed.

Fifth Embodiment

Figures 17A, 17B:
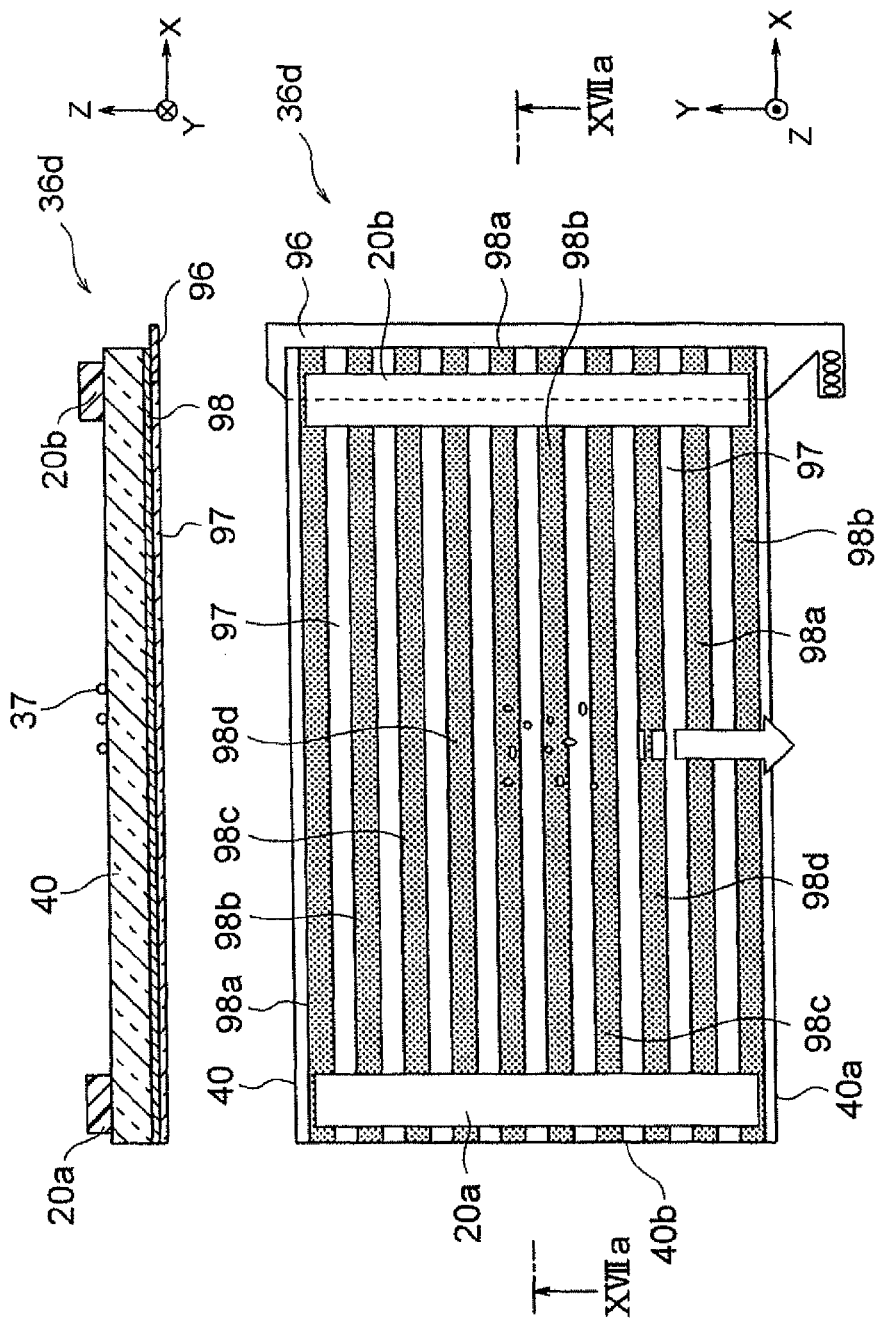
FIG. 17a and FIG. 17b are a cross sectional view and a plane view of an anti dust filter in an optical device according to a fifth embodiment of the present invention.

FIG. 17a and FIG. 17b are a cross sectional view (FIG. 17a) and a plane view (FIG. 17b) of an anti dust filter in an optical device 36d according to a fifth embodiment of the present invention. An optical device according to the fifth embodiment comprises a first oscillation element 20a and a second oscillation element 20d, and is different in a locating surface of the oscillation elements 20a, 20b in the antidust filter 36d and is similar with the optical device according to the fourth embodiment other than that difference.

The antidust filter 36d comprises a base member 40 having a rectangular shape, a plurality of electrodes 98 and a surface layer 97. The electrodes 98 are formed on a surface of a Z-axis negative direction of the base member portion 40 as similar with the electrode 92 according to the fourth embodiment. Also, the electrodes 98 are formed as extends to a direction which is a substantially parallel to a long side 40a of the base member portion 40.

The plurality of the electrodes 98 is arranged with spaces so as to be respective spaces become a predetermined length along with a short side 40b of the base member portion 40. A wiring portion 96 is attached to one ends of the respective electrodes 98 (end portions of a X-axis positive direction side in the present embodiment). The electrodes 98 are electrically connected with the voltage signal output circuit 28 (FIG. 1) via the wiring portion 96.

The plurality of the electrodes 93 are composed of a plurality of groups to which AC voltage having different phases respectively are applied. Namely, the plurality of the electrode 98 in the present embodiment is composed of a first group electrode 98a to which a first voltage signal is input, a second group electrode 98b to which a second voltage signal is input, a third group electrode 98c to which a third voltage signal is input and a fourth group electrode 98d to which a fourth voltage signal is input.

The optical device according to the fifth embodiment comprises a first oscillation element 20a and a second oscillation element 20b which are provided along a pair of short side 40b in the antidust filter 36d. Because the optical device according to the fifth embodiment comprises the two oscillation elements 20a, 20b which are arranged as substantially parallel each other, the dust can be removed efficiently by generating further strong vibration to the antidust filter 36d.

Also, the second oscillation element 20b and the wiring portion 96 are arranged at an end portion of YX axes positive direction side in the antidust filter 36d. Namely, the second oscillation element 20b and the wiring portion 96 are arranged at a position where overlapping each other, in case that viewing from an optical axis α direction (a Z-axis direction). By locating the second oscillation element 20b and the wiring portion 96 as overlapping to the axis direction, it is possible to prevent growth of an area to where an imaging light does not transparent at the surface of the antidust filter 36d. Thus, the optical device according to the fifth embodiment can prevent the growth of an area of the antidust filter 36d with increasing dust removing effect by generating strong vibration to the antidust filter 36d. Also, the optical device according to the present embodiment performs effects similar with the optical device according to the fourth embodiment.

Sixth Embodiment

FIG. 18a and FIG. 18b are a cross sectional view (FIG. 18a) and a plane view (FIG. 18b) of an anti dust filter in an optical device 36e according to a sixth embodiment of the present invention. The optical device according to the sixth embodiment comprises a first oscillation element 20a and a second oscillation element 20b, and the optical device is different in a locating surface of electrodes 103 and a wiring portion 102 and the optical device is similar with the optical device according to the third embodiment other than those differences.

The antidust filter 36e comprises a base member portion 40 having a rectangular shape, a plurality of electrodes 103 and a surface layer 104. The electrodes 103 are formed on a surface of a Z-axis negative direction side of the base member portion 40, which is different from the electrode 42 according to the third embodiment. However, the electrode 103 are formed as extend to a direction which is an substantially parallel to a short side 40b of the base member portion 40, which is similar with the electrode 42 according to the third embodiment.

The plurality of the electrodes 103 is arranged with spaces so as to be respective spaces become a predetermined length along a long side 40b of the base member portion 40. A wiring portion 102 is attached to one ends of the respective electrodes 103 (end portions of a X-axis positive direction side in the present embodiment). The electrodes 103 are connected with the voltage signal output circuit 28 via the wiring portion 102.

The plurality of the electrodes 103 are composed of a plurality of groups to which AC voltage having different phases respectively are applied. Namely, the plurality of the electrode 103 in the present embodiment is composed of a first group electrode 103a to which a first voltage signal is input, a second group electrode 103b to which a second voltage signal is input, a third group electrode 103c to which a third voltage signal is input and a fourth group electrode 103d to which a fourth voltage signal is input.

The optical device according to the sixth embodiment comprises a first oscillation element 20a and a second oscillation element 20b which are provided along a pair of short side 40b of the base portion 40 in the antidust filter 36e. Because the optical device according to the sixth embodiment comprises the two oscillation elements 20a, 20b which are arranged as substantially parallel each other, the dust can be removed efficiently by generating further strong vibration to the antidust filter 36e.

Also, one part of the first and second oscillation elements 20a, 20b and one part of the wiring portion 102 are arranged as overlapping each other viewing from an optical axis α direction (a Z-axis direction). Thereby, the antidust filter 36e can prevent growth of an area to where an imaging light does not transparent at the surface of the antidust filter 36e, as similar with the antidust filter 36d shown in FIG. 17a and FIG. 17b. Also, the optical device according to the present embodiment performs effects similar with the optical device according to the third embodiment.

Although in the antidust filters 36d, 36e according to the fifth and sixth embodiment, the electrodes 98, 103 are arranged to one surface of the base member, and the oscillation elements 20a, 20b are arranged to other side surface of the base member, arrangements of the electrodes and the oscillation elements are not limited thereto. For example, an electrode and a surface layer may be formed on one surface of base member, the oscillation elements 20a, 20b may be fixed to the surface layer, and thereby effects similar with the antidust filters 36d, 36e according to the fifth and sixth embodiments can be obtained.

Also, an image processing controller 66 shown in FIG. 1 and FIG. 9 may reduce a shadow of the electrode 42 by image processing in case that the shadow of the electrode 42 reflects off an image picture taken by the image pick up element unit 16. Thereby, it is possible to prevent effects given to optical properties of an image taking device by the electrode 42.

Seventh Embodiment

Figure 20:
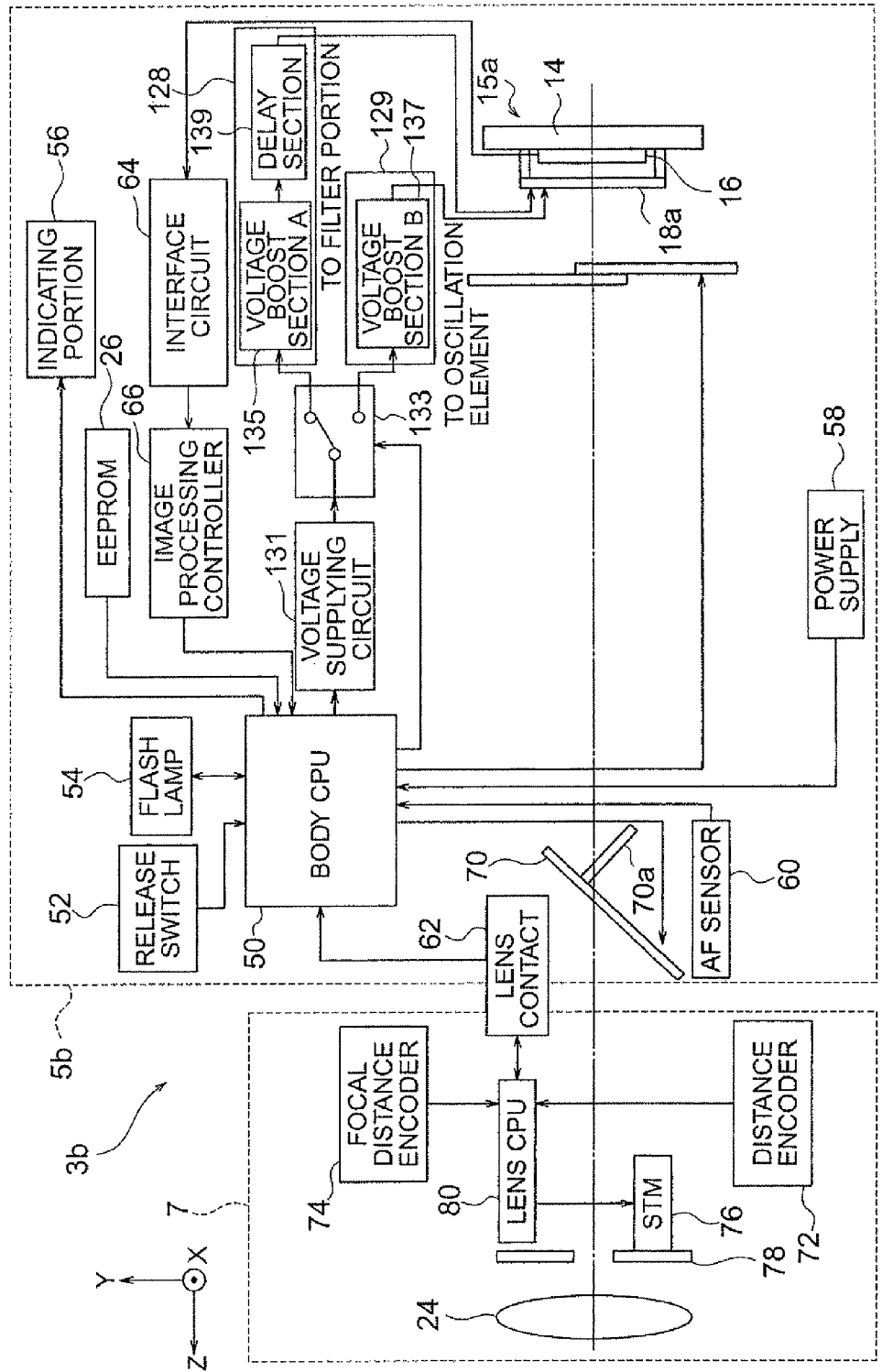
FIG. 20 is whole block diaphragm of a camera to which an optical device according to a seventh embodiment is equipped.

FIG. 20 is a whole block diaphragm of a camera 3b wherein an optical device according to a seventh embodiment of the present invention is equipped. The camera 3b is similar with the camera 3b of the third embodiment except for a voltage supplying circuit 131 and a switch section 133 are further provided and the voltage signal output circuit 128 and the oscillation element driving circuit 129 are different from the third embodiment shown in FIG. 9. Namely, because structures of a filter portion 18a and an antidust filter 36b which is included thereto are similar with the second embodiment shown in FIGS. 10 to 12, the explanation thereof is omitted.

As similar with the voltage signal output circuit 28 according to the first and the second embodiments, the voltage signal output circuit 128 outputs voltages to a plurality of electrode 42 provided at a filter portion 18a in an image element neighbor portion 15a. The voltage signal output circuit 128 is composed of a voltage boost section A 135 and a delay section 139, and does not include a signal generating section 82 shown in FIG. 7. However, a voltage signal generated in the voltage supplying circuit 131 is input to the voltage signal output circuit 128 via the switch section 133.

As similar with the oscillation element driving circuit 29 according to the second embodiment, the oscillation element driving circuit 129 may drive an oscillation element 20 (FIG. 1) provided at the image element neighbor portion 15a. Although a voltage boost section B 137 is included in the oscillation element driving circuit 129, a signal generation portion is not included as similar with the voltage signal output circuit 128. Also, as similar with the voltage signal output circuit 128, a voltage signal generated in the voltage supplying circuit 131 is input to the oscillation element driving circuit 129 via the switch section 133.

The voltage supplying circuit 131 is connected with the body CPU 50. The voltage supplying circuit 131 generates a voltage signal based on a control signal from the body CPU 50, and supplies the generated voltage signal to the voltage signal output circuit 128 and the oscillation element driving circuit 129. For example, it is preferable that necessary electric power is supplied from the power source 58 to the voltage supplying circuit 131. Also, a sweep circuit 131a (refer to FIG. 21) which changes frequency of a voltage signal to be output to the voltage signal output circuit 128 and the oscillation element driving circuit 129 according to a time may be included in the voltage supplying circuit 131.

The switch section 133 is arranged between the voltage supplying circuit 131 and the voltage signal output circuit 128 or the oscillation element driving circuit 129. The switch section is provided at a latter part of the voltage supplying circuit 131 and at a former part of the voltage signal output circuit 128 and the oscillation element driving circuit 129. Therefore, the switch section 133 transmits a voltage signal which is output from the voltage supplying circuit 131 to the voltage signal output circuit 128 and the oscillation element driving circuit 129.

The switch section 133 select any one of the voltage signal output circuit 128 or the oscillation element driving circuit 129 to connect electrically to the voltage supplying circuit 131 by receiving the controlling from the body CPU 50. For example, in series of dust removing operation, the switch section 133 connects the voltage supplying circuit 131 and the oscillation element driving signal 129, then connects the voltage supplying circuit 131 and the voltage signal output circuit 129, after this, connects the voltage supplying circuit 131 and the oscillation element driving circuit 129 again.

Figure 21:
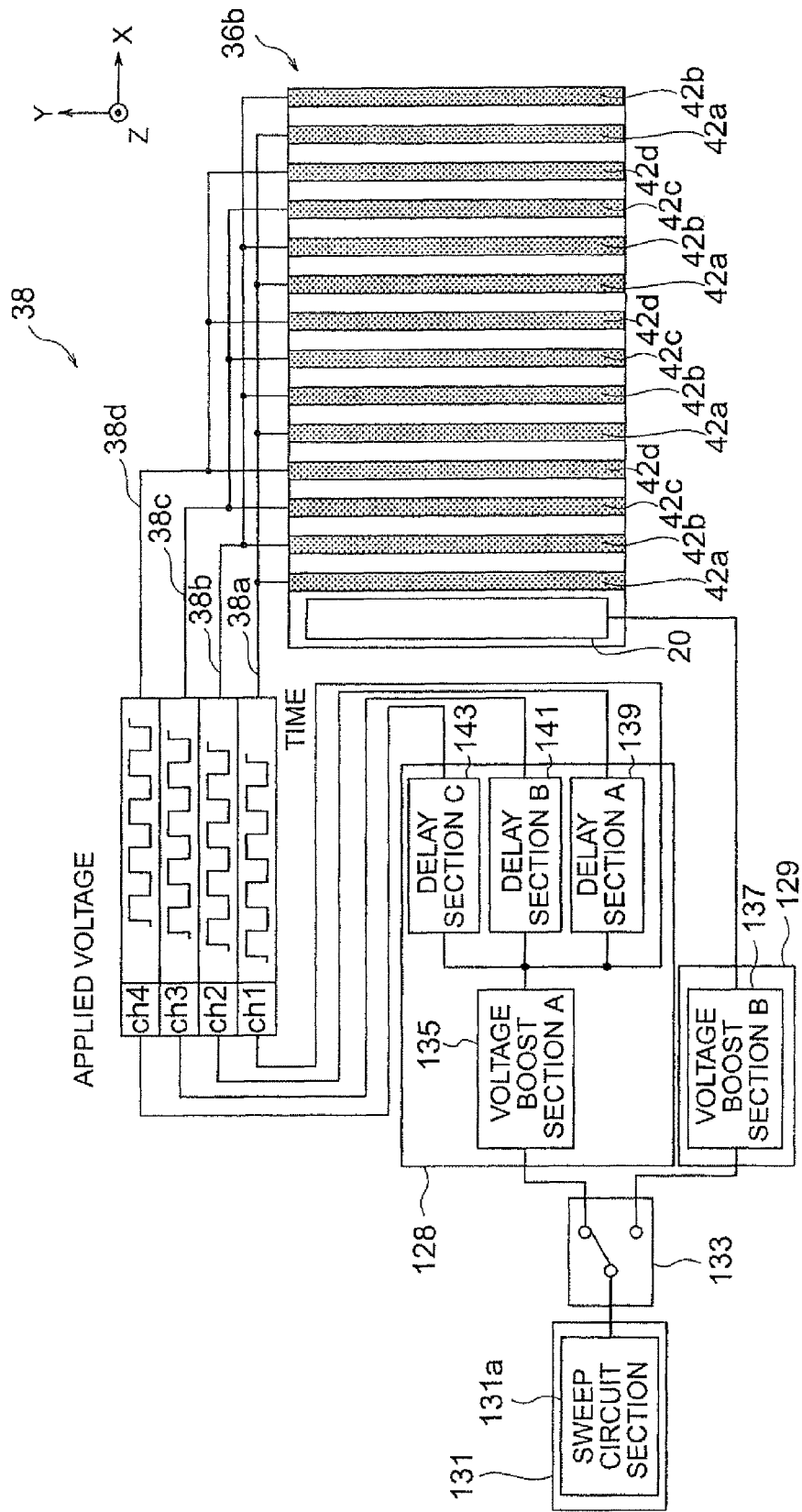
FIG. 21 is a schematic diaphragm for explaining dust removal operation by the optical device according to the seventh embodiment of the present invention.

FIG. 21 is a schematic view for explaining a dust removing performance operated at an optical device according to the seventh embodiment. A voltage signal is supplied from the voltage supplying circuit 131 to electrodes 42a to 42b of the antidust filter 36 and an oscillation element 20 provided in the antidust filter 36b. For example, the voltage supplying circuit 131 generates AC voltage signal having a predetermined frequency by receiving the controlling from the CPU 50 (refer to FIG. 20) and outputs to the switch section 133. Although a wave pattern of the voltage signal to be output from the voltage supplying signal 131 is not particularly limited, for example, voltage signals of a rectangular wave shape, sin wave shape can be used.

Also, the voltage supplying circuit 131 may include the sweep circuit section 131a which causes to change a frequency of a voltage signal with a time passage. The voltage supplying circuit 131 including the sweep circuit section 131a can change frequencies of progressive waves generated by electrodes 42a to 42b transitionally and can move dust of various particle diameter or charged condition. Also, the voltage supplying circuit 131 including the sweep circuit section 131a is available to resonate the antidust filter 36b certainly at the time of causing bending vibration of the antidust filter 36b by the oscillation element 20, and it is available to generate strong vibration at the antidust filter 36b.

A voltage signal generated at the voltage supplying circuit 131 is input to the voltage signal output circuit 128 via the switch section 133. The voltage signal output circuit 128 according to the present embodiment comprises a voltage boost section. A 135, a delay section A 139, a delay section B 141 and a delay section C 143. The voltage boost section A 135 boosts or amplifies a voltage signal provided from the voltage supplying circuit 131 to predetermined amplitude. Note that, the boost section A 135 may be provided at latter parts of the delay section A 139, the delay section B 141 and the delay section C 143.

The voltage signal boosted by the voltage boost section A135 is branched into four. In the branched four signals, one becomes a first driving signal ch1 which is input to the first electrode group 42a via a first wiring 38a. The left three of the four branched signals are input to the delay section A139, the delay section B141 and the delay section C143 respectively. The delay section A139 causes to delay the voltage signal which is input from the voltage boost section A135 at quarter cycle and outputs a second driving signal ch2. The delay section B141 and the delay section C143 delay the voltage signals which are input from the voltage boost section A135 at half cycle or three-quarter cycle, and output a third driving voltage signal ch1 or a fourth driving voltage signal ch4.

The driving voltage signal ch1 to ch4 to be output from the voltage signal output circuit 128 are, as similar with the first embodiment, input to the first to fourth electrodes 42a to 42d via the wiring portion 38. An electric field of traveling waves which causes to move dust is generated on a surface of the antidust filter 36b by electrodes 42 to which voltage is applied using the driving voltage signals ch1 to ch4.

As similar with the voltage signal output circuit 128, a voltage signal generated at the voltage supplying circuit 131 is input to the oscillation element driving circuit 129 via the switch section 133. The oscillation element driving circuit 129 according to the present embodiment comprises a voltage boost section B137. The voltage boost section B137 boosts or amplifies a voltage signal generated by the voltage supplying circuit 131 to predetermined amplitude, in response to necessity. A voltage signal which is output from the oscillation element driving circuit 129 is input to the oscillation element 20. The oscillation element 20 is driven by a voltage signal which is input from the oscillation element driving circuit 129 and can cause bending vibration of the antidust filter 36b.

The camera 3b shown in FIG. 20 can perform dust removing operation according to a flow chart shown in FIG. 19, as similar with a camera 3a shown in FIG. 12a and FIG. 12b. In a step S101 shown in FIG. 19, the camera 3b commences a series of dust removing operation.

In a step S102, the camera 3b performs dust removing operation by causing bending vibration of the antidust filter 38b shown in FIG. 21. In the step S102, a control signal is output from the body CPU 50 shown in FIG. 20 to the voltage supplying circuit 131 and the switch section 133. The voltage supplying circuit 131 generates a voltage signal by receiving the control signal from the body CPU 50 and outputs to the switch section 133. The switch section 133 electrically connects the voltage supplying circuit 131 and the oscillation element driving circuit 129 with receiving the control signal from the body CPU 50.

The oscillation element driving circuit 129 boosts a voltage signal which is output from the voltage supplying circuit 131 at the voltage boost section B137 and outputs to the oscillation element 20 shown in FIG. 21. Thereby, in the step S102, bending vibration is generated as similar with the third embodiment (FIG. 13). In the dust removal operation of the step S102, as shown in FIG. 13, there is a case that dust cannot be removed remains at a neighborhood 101 of nodes 99.

In a step S103 shown in FIG. 19, the camera 3b shown in FIG. 20 performs dust removing operation by generating an electric field of traveling waves on the surface of the antidust filter 36b shown in FIG. 21. When staring the step S103, a controlling signal is output to the switch section 133 from the body CPU 50 shown in FIG. 20. The switch section 133 electrically connects the voltage supplying circuit 131 and the voltage signal output circuit 128 and disconnects the voltage supplying circuit 131 and the oscillation element driving circuit 129 by receiving the controlling signal from the body CPU 50. Note that, the body CPU 50 may change a frequency of voltage signal generated at the voltage supplying circuit 131 by outputting the controlling signal to the voltage supplying circuit 131 when stating the step S103.

The voltage signal output circuit 128 causes to branch a voltage signal which is output from the voltage supplying circuit 131 after voltage boosting at the voltage boost section A 135. The voltage signal output circuit 128 performs delaying process after the branch into four of the boosted voltage signal, and outputs the first to fourth driving signals ch1 to ch4 to the first to fourth electrodes 42a to 42d. Thereby, in the step S103, as similar with the third embodiment, an electric field of traveling waves is generated on the surface of the antidust filter 36b (FIG. 14a and FIG. 14b).

As sown in FIG. 14a and FIG. 14b, in the step S103, the dust 37 remaining on the antidust filter 36b is moved along a X-axis direction by an electrostatic force provided from an electric field generated by the electrodes 42 shown by an arrow 105. The voltage supplying circuit 131 and the voltage signal output circuit 128 may apply voltage to the electrode 42 until the dust 47 which remains at a neighborhood of a position where nodes 99 of vibration generated, moves to a position away from the nodes 99 of the vibration.

In s step S104, the camera 3b performs antidust operation by causing bending vibration the antidust filter 38b shown in FIG. 21 again. When stating the step S14, the control signal is outputs to the switch section 133 for the body CPU 50 shown in FIG. 20. The switch section 133 electrically connects the voltage supplying circuit 131 and the oscillation element driving circuit 129 by changing connection of the latter stage of the voltage supplying circuit 131 with receiving the control signal from the body CPU 50. Note that, the body CPU 50 may change a frequency of the voltage signal generated at the voltage supplying circuit 131 by outputting the controlling signal to the voltage supplying circuit 131, when starting the step S104, which is similar to when starting the steps S103.

The oscillation element driving signal 29 boosts the voltage signal which is output from the voltage supplying circuit 131 at a voltage boost section B137 and outputs to the oscillation element 20 shown in FIG. 21. Thereby, in the step S104, as similar with the step S102, bending vibration is generated (refer to FIG. 15). The dust which cannot be removed in the step S102 is removed from the surface of the antidust filter 36b by the bending vibration at the step S104, because the dust is moved to positions away from the nodes 99 of the vibration by the step S103.

In a step S105 shown in FIG. 19, the dust removing operation is finished. The body CPU 50 outputs the control signal to the voltage supplying signal 131 at the step S105 to stop generation of the voltage signal.

In this manner, because the optical device according to the present embodiment can perform the both dust removing operation to cause the binding vibration of the antidust filter 36b and dust removing operation to cause changing an electric field on the antidust filter 36b, it is available to remove the dust 37 adhered on the surface of the antidust filter 36b efficiently. Namely, the dust having comparatively large mass and the dust adhered at sections other than adjacent of the nodes of vibration can be removed by dust removing operation according to the bending vibration. Also, the dust having comparatively small mass and the dust adhered at sections adjacent to the nodes of vibration can be removed by dust removing operation according to the electric field of traveling waves.

Also, the optical device according to the present embodiment comprises the voltage supplying circuit 131 to supply the voltage signal to the both voltage signal output circuit 128 and the oscillation element driving circuit 129 to generate the voltage signal used for the antidust operation by the bending vibration and the voltage signal used for the antidust operation by the electric field of traveling waves. Thus, as compared from a case that the voltage signal output circuit 128 and the oscillation voltage signal 129 comprise a signal generating section individually, a optical device which is available to realize the both dust removing operations of bending vibration and the electric field of traveling waves can be realized at low cost further. Also, the dust removing operation by the bending vibration and the dust removing operation by the electric field of traveling waves can be changed easily by switching electrical connection of the latter of the voltage supplying circuit 131 according to the switch section 133.

The invention claimed is:

1. An optical device comprising:
   a plurality of light transmissive electrodes provided at a light transmissive substrate,
   an output circuit that outputs voltage to said electrodes so as to generate an electric field of traveling waves moving in a predetermined direction on a surface of said substrate,
   a vibration member provided on said substrate so as to vibrate said substrate, and
   a driving circuit which drives said vibration member so as to generate nodes of vibration on said substrate, wherein
   said output circuit shifts a charged dust by generating said electric field of traveling waves moving in the predetermined direction on the surface of said substrate, and
   said output circuit outputs voltage to said electrodes so as to generate the electric field of traveling waves moving in the predetermined direction on said substrate at the same time as said driving circuit drives said vibration member.

2. The optical device as set forth in claim 1, wherein
   at least one part of said electrodes is provided close to said nodes of vibration on said substrate.

3. The optical device as set forth in claim 1, wherein
   said vibration member and said electrodes are almost parallel.

4. An optical device comprising:
- a plurality of light transmissive electrodes provided at a light transmissive substrate,
- an output circuit that outputs voltage to said electrodes so as to generate an electric field of traveling waves moving in a predetermined direction on a surface of said substrate,
- a vibration member provided on said substrate so as to vibrate said substrate, and
- a driving circuit which drives said vibration member so as to generate nodes of vibration on said substrate, wherein
- said output circuit shifts a charged dust by generating said electric field of traveling waves moving in the predetermined direction on the surface of said substrate, and
- said output circuit outputs voltage to said electrodes so as to generate the electric field of traveling waves moving in the predetermined direction on said substrate at a different time as said driving circuit drives said vibration member.

5. The optical device as set forth in claim 4, wherein
- said output circuit outputs voltage to said electrodes so as to generate the electric field of traveling waves moving in the predetermined direction on said substrate after said driving circuit drives said vibration member.

6. The optical device as set forth in claim 4, wherein
- said output circuit outputs voltage to said electrodes so as to generate the electric field of traveling waves moving in the predetermined direction on said substrate before said driving circuit drives said vibration member.

7. The optical device as set forth in claim 4, wherein
- said vibration member and said electrodes are almost parallel.

* * * * *